(12) United States Patent
Napper

(10) Patent No.: US 12,354,155 B2
(45) Date of Patent: *Jul. 8, 2025

(54) SCHEDULING OF ORDER PROCESSING FOR REMOTELY ORDERED GOODS

(71) Applicant: Expose Retail Strategies, Inc., St. Catharines (CA)

(72) Inventor: David Napper, St. Catharines (CA)

(73) Assignee: Expose Retail Strategies, Inc., St. Catharines, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/479,722

(22) Filed: Oct. 2, 2023

(65) Prior Publication Data
US 2024/0029146 A1    Jan. 25, 2024

Related U.S. Application Data

(63) Continuation of application No. 17/368,235, filed on Jul. 6, 2021, now Pat. No. 11,776,044, which is a
(Continued)

(51) Int. Cl.
*G06Q 30/00* (2023.01)
*B25B 11/00* (2006.01)
(Continued)

(52) U.S. Cl.
CPC .......... *G06Q 30/0635* (2013.01); *B25B 11/00* (2013.01); *G06Q 10/06* (2013.01);
(Continued)

(58) Field of Classification Search
None
See application file for complete search history.

(56) References Cited

U.S. PATENT DOCUMENTS

| 5,648,770 A | 7/1997 | Ross |
| 6,026,375 A | 2/2000 | Hall et al. |

(Continued)

FOREIGN PATENT DOCUMENTS

| WO | 2004017611 A2 | 2/2004 |
| WO | 2004095173 A8 | 12/2005 |

(Continued)

OTHER PUBLICATIONS

PCT Notification of Transmittal of the International Search Report and the Written Opinion of the International Searching Authority, or the Declaration; Date of mailing: Sep. 12, 2012; International Appln No. PCT/CA2012/000644.

(Continued)

*Primary Examiner* — Mila Airapetian
(74) *Attorney, Agent, or Firm* — Jonathan M. D'Silva; MMI Intellectual Propert

(57) ABSTRACT

A computer-implemented method for scheduling processing of an order for goods at a provider location obtains an arrival estimate for when a user associated with the order is expected to arrive at the provider location and uses the arrival estimate to schedule processing of the order. Processing may be scheduled so that completion of order processing is expected to substantially coincide with arrival of the user at the provider location. The method may also obtain an order completion estimate for when processing of the order is expected to be completed and use both the arrival estimate and the order completion estimate to schedule processing of the order. The method may update one or both of the arrival estimate and the order completion estimate. The method may be executed by a networked mobile wireless telecommunication computing device of the user, or by a data processing system associated with the provider.

18 Claims, 27 Drawing Sheets

Related U.S. Application Data continuation of application No. 17/024,546, filed on Sep. 17, 2020, now Pat. No. 11,087,386, which is a continuation of application No. 15/627,250, filed on Jun. 19, 2017, now Pat. No. 10,810,653, which is a continuation of application No. 14/757,820, filed on Dec. 23, 2015, now Pat. No. 9,710,848, which is a continuation of application No. 14/244,639, filed on Apr. 3, 2014, now abandoned, which is a continuation of application No. 13/355,132, filed on Jan. 20, 2012, now Pat. No. 8,732,028.

(60) Provisional application No. 61/511,965, filed on Jul. 26, 2011.

(51) Int. Cl.

| | |
|---|---|
| *G06Q 10/06* | (2023.01) |
| *G06Q 10/0631* | (2023.01) |
| *G06Q 10/08* | (2023.01) |
| *G06Q 20/12* | (2012.01) |
| *G06Q 20/32* | (2012.01) |
| *G06Q 30/06* | (2023.01) |
| *G06Q 30/0601* | (2023.01) |
| *G06Q 50/12* | (2012.01) |
| *H04W 4/021* | (2018.01) |
| *H04W 4/50* | (2018.01) |
| *B27B 21/00* | (2006.01) |

(52) U.S. Cl.
CPC ... *G06Q 10/0631* (2013.01); *G06Q 10/06316* (2013.01); *G06Q 10/08* (2013.01); *G06Q 20/12* (2013.01); *G06Q 20/3224* (2013.01); *G06Q 30/06* (2013.01); *G06Q 50/12* (2013.01); *H04W 4/021* (2013.01); *H04W 4/50* (2018.02); *B27B 21/00* (2013.01)

(56) References Cited

U.S. PATENT DOCUMENTS

| | | |
|---|---|---|
| 7,974,873 B2 | 7/2011 | Simmons et al. |
| 2002/0128850 A1 | 9/2002 | Chen et al. |
| 2002/0188492 A1* | 12/2002 | Borton ............ G06Q 10/06316 |
| | | 705/7.31 |
| 2003/0061109 A1 | 3/2003 | Banerjee et al. |
| 2004/0177008 A1 | 9/2004 | Yang |
| 2006/0010037 A1 | 1/2006 | Angert et al. |
| 2006/0155591 A1 | 7/2006 | Altaf et al. |
| 2007/0064914 A1* | 3/2007 | Seyer .................... G06Q 10/00 |
| | | 379/265.06 |
| 2007/0073586 A1 | 3/2007 | Dev et al. |
| 2008/0082424 A1 | 4/2008 | Walton |
| 2010/0198646 A1 | 8/2010 | Mikan et al. |
| 2011/0028132 A1 | 2/2011 | Bos |
| 2011/0112759 A1 | 5/2011 | Bast et al. |

FOREIGN PATENT DOCUMENTS

| | | |
|---|---|---|
| WO | 2007041672 A2 | 4/2007 |
| WO | 2008157677 A1 | 12/2008 |

OTHER PUBLICATIONS

European Search Report, dated Dec. 3, 2012; Appln. No. EP12176785.

* cited by examiner

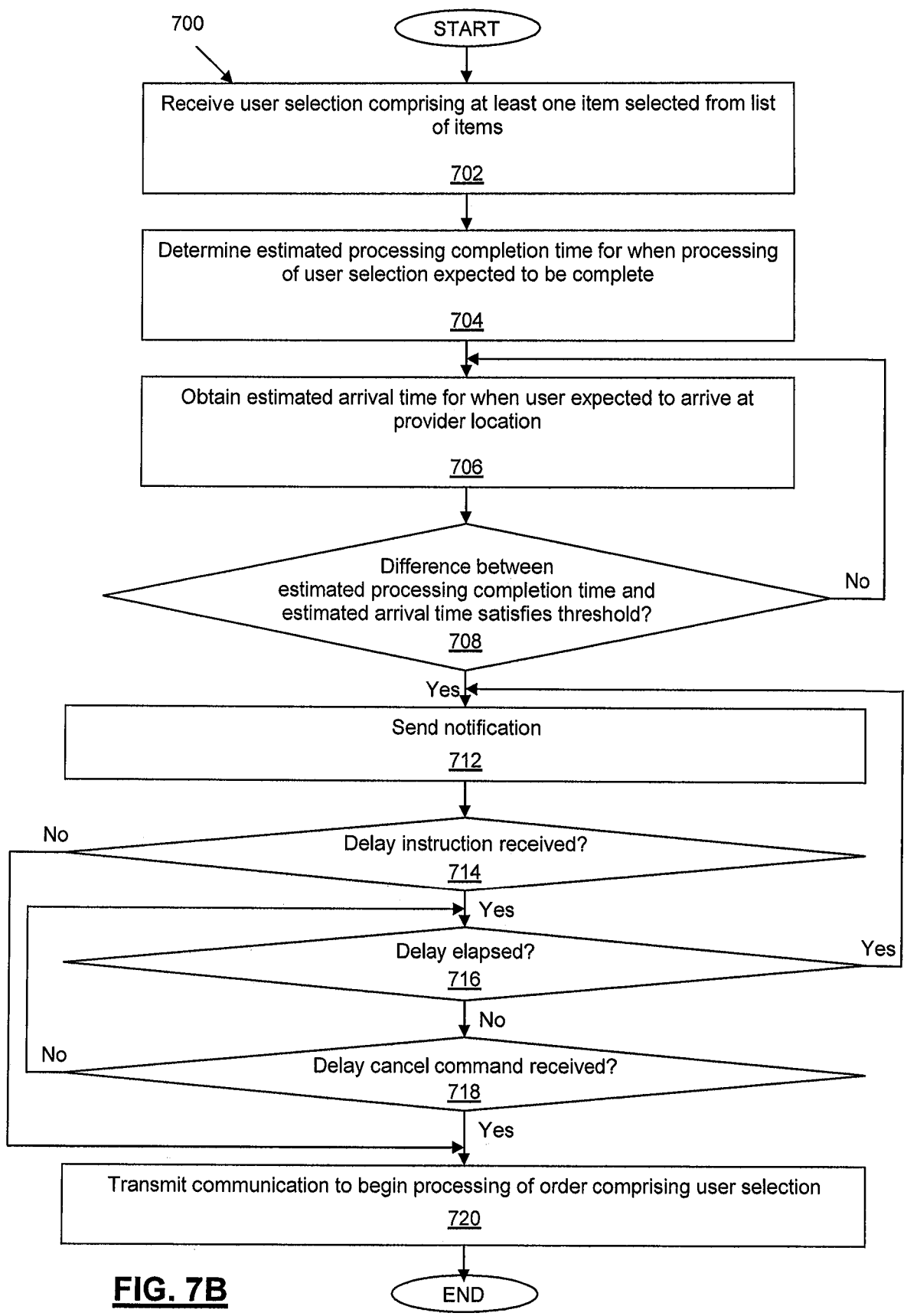

SCHEDULING OF ORDER PROCESSING FOR REMOTELY ORDERED GOODS

CROSS-REFERENCE TO RELATED APPLICATION

This application claims priority to U.S. application Ser. No. 17/368,235 filed on Jul. 6, 2021, which is a continuation of Ser. No. 17/024,546 filed Sep. 17, 2020 (now U.S. Pat. No. 11,087,386) which is a continuation of U.S. application Ser. No. 15/627,250 filed Jun. 19, 2017 (now U.S. Pat. No. 10,810,653) which is a continuation of U.S. application Ser. No. 14/757,820 (now U.S. Pat. No. 9,710,848) filed Dec. 23, 2015, which is a continuation of U.S. application Ser. No. 14/244,639, which is a continuation of U.S. application Ser. No. 13/355,132 (now U.S. Pat. No. 8,732,028) filed on Jan. 20, 2012, which in turn takes priority from U.S. Provisional Application No. 61/511,965 filed Jul. 26, 2011, the teachings of which are hereby incorporated by reference.

TECHNICAL FIELD

The present disclosure relates to ordering systems for ordering goods, and more particularly to scheduling of order processing for remotely ordered goods.

BACKGROUND

There are many remote ordering systems available that allow a user to place an order for goods using a networked mobile wireless telecommunication computing device, such as a smartphone. However, these systems do not account for the fact that the travel time and the preparation time may be different, resulting either in loss of quality or the customer having to wait. For example, before leaving work a user could use his or her smartphone to place an online order for a pizza to be picked up on the way home. However, in most cases the user will arrive at the pizzeria either to find that the pizza has been ready for some time and is rapidly losing heat and freshness, or else the user will have to wait for the pizza to be ready, wasting valuable time.

SUMMARY

A user can use a networked computing device, for example a networked mobile wireless telecommunication computing device, such as a smartphone, to identify a suitable location of a provider of goods, view a list of items available from the provider, and generate an order for goods in advance, with processing of the order being timed so that the order will generally be completed at about the same time as the user arrives.

A computer-implemented method for scheduling processing of an order for goods at a provider location comprises obtaining an arrival estimate for when a user associated with the order is expected to arrive at the provider location and using the arrival estimate to schedule processing of the order. In one embodiment, processing of the order is scheduled so that completion of processing of the order is expected to substantially coincide with arrival of the user at the provider location. The method may be executed by a networked mobile wireless telecommunication computing device of the user, or by a data processing system associated with the provider.

The method may further comprise obtaining an order completion estimate for when processing of the order is expected to be completed and using both the arrival estimate and the order completion estimate to schedule processing of the order so that completion of processing of the order is expected to substantially coincide with arrival of the user at the provider location. Using the arrival estimate and the order completion estimate to schedule processing of the order may comprise comparing the arrival estimate and the order completion estimate, and may comprise updating one or both of the arrival estimate and the order completion estimate and comparing the then-current arrival estimate and the then-current order completion estimate according to the updating.

The arrival estimate may comprise an estimated travel time of the user to the provider location, or may comprise an estimated arrival time of the user at the provider location, and the order completion estimate may comprise an estimated duration of the processing of the order or may comprise an estimated completion time for the order given a specified start time for the order.

In one embodiment, each item in the order has a "prep" or "pick" time, and the estimated total preparation time for the order can be determined in advance and compared to the user's estimated travel time or estimated time of arrival determined, for example, using a GPS or other locating system of the networked computing device. Commencement of processing of the order may be delayed by the provider based on the user's estimated travel time or estimated time of arrival, or the order, or the instructions to begin processing the order, may be delayed until the locating system indicates that the estimated travel time to the pick-up location is approximately equal to the estimated processing time for the order. The order can be automatically placed and forwarded to the relevant location to begin processing, and a receipt containing an identification code sent to the user.

For example, before leaving his or her workplace, a user having a GPS-enabled smartphone could prepare an order for take-out food that he or she intends to pick up for dinner, and then begin the homeward journey. The smartphone would not transmit the order, or would transmit the order but not transmit a start signal, until its GPS system indicated that the remaining travel time to the restaurant was about the same as the time required to prepare the food being ordered. As a result, when the user arrives at the restaurant, the food will in most cases be ready and still hot and fresh, or else moments away from completion.

One exemplary embodiment of a computer-implemented method for scheduling processing of an order for goods at a provider location comprises obtaining an arrival estimate for when a user associated with the order is expected to arrive at the provider location, obtaining an order completion estimate for when processing of the order is expected to be completed, and comparing the arrival estimate and the order completion estimate. In response to a determination that the arrival estimate and the order completion estimate substantially coincide, the method provides a signal to commence processing of the order. In response to a determination that the arrival estimate and the order completion estimate do not substantially coincide, the method updates at least one of the arrival estimate and the order completion estimate and returns to the step of comparing the arrival estimate and the order completion estimate after the updating. The updating may comprise obtaining an updated arrival estimate based on time elapsed or may comprise obtaining a dynamically recalculated arrival estimate.

In one particular embodiment, the arrival estimate and the order completion estimate are deemed to coincide when comparing the arrival estimate and the order completion estimate indicates that the user associated with the order is expected to arrive at the provider location before the order is expected to be completed. The method may be executed by a networked mobile wireless telecommunication computing device of the user, or by a data processing system associated with the provider.

The order completion estimate may be a fixed value, or may be dynamically generated, and may be an estimated duration of the processing of the order or may be an estimated completion time for the order given a specified start time for the order.

The arrival estimate may be an estimated travel time of the user to the provider location, or may be an estimated arrival time of the user at the provider location.

A computer-implemented method for processing an order comprises receiving, at an order processing system, a location-triggered communication sent from a networked mobile wireless telecommunication computing device and associated with an order for goods and, responsive to the location-triggered communication, sending a signal to commence processing the order for goods.

The method may further comprise receiving at the order processing system a request from the mobile wireless telecommunication computing device and, responsive to the request, transmitting to the mobile wireless telecommunication computing device an item list comprising a list of available items and corresponding processing times for each item in the list. Alternatively, the item list may form part of an application program installable on the mobile wireless telecommunication computing device.

The location-triggered communication may include payment information, and the method may further comprise processing the payment information and, responsive to successful processing of the payment information, transmitting an order receipt to the mobile wireless telecommunication computing device. Processing the payment information may comprise receiving and verifying payment confirmation from a payment service associated with the mobile wireless telecommunication computing device, and the order receipt may be transmitted directly to the mobile wireless telecommunication computing device or may be transmitted to the payment service for transmission by the payment service to the mobile wireless telecommunication computing device.

A method for communicating a commercial solicitation comprises receiving a query comprising location information and, responsive to the query, determining at least one local provider having a provider location within a predetermined proximity to a location specified by the location information, and transmitting at least one commercial solicitation associated with a respective one of the at least one local provider.

In a particular implementation of the method, the query is received from a networked mobile wireless telecommunication computing device, the location information comprises a location of the mobile wireless telecommunication computing device and the at least one commercial solicitation is transmitted to the mobile wireless telecommunication computing device.

The method may further comprise receiving commercial data from a plurality of providers comprising the at least one local provider and using the commercial data to generate the at least one commercial solicitation. The method may comprise requesting the commercial data from the at least one local provider in response to the query.

In certain implementations of the method, the query further comprises a specification indicating an area of interest, and the at least one local provider is selected according to correspondence with the specification.

The present disclosure also contemplates networked mobile wireless telecommunication computing devices and other computer systems having at least one processor and memory coupled to the processor, with the memory containing instructions which, when executed by the at least one processor, cause the mobile wireless telecommunication computing device or other computer system to implement one or more of the methods described herein. A mobile wireless telecommunication computing device for use with methods described herein will typically also include a location system coupled to the processor and a wireless communication module coupled to the processor for connecting to a network.

The present disclosure is further directed to computer program products comprising a computer readable storage medium having computer readable program code embodied therewith for implementing one or more of the methods described herein.

The above summary is provided only by way of overview, and is not intended to limit the scope of the appended claims.

BRIEF DESCRIPTION OF THE DRAWINGS

These and other features will become more apparent from the following description in which reference is made to the appended drawings wherein:

FIG. 7B is a flow chart illustrating a fourth exemplary implementation of the method of FIG. 2A;

DETAILED DESCRIPTION

As described and illustrated herein systems, methods and computer program products are provided for scheduling processing at a provider location of an order associated with a user, typically so that completion of processing of the order substantially coincides with arrival of the user at the provider location. These systems, methods and computer program products have particular application in the processing of orders for goods that spoil rapidly, such as in quick service restaurants, although they are not limited to these applications and may also be used, for example, in stores selling groceries or merchandise that is not subject rapid spoilage or degradation.

Figure 1:
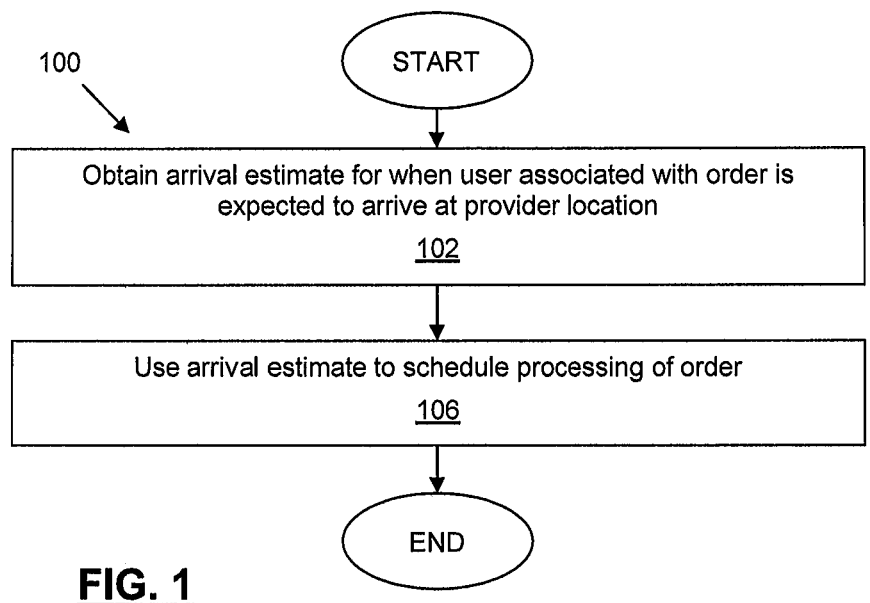
FIG. 1 is a flow chart showing generally an exemplary method for scheduling processing of an order for goods at a provider location.

Referring first to FIG. 1, an exemplary method for scheduling processing of an order for goods at a provider location is shown generally at 100. The method 100 is generally implemented by a computer system. In some embodiments, the method 100 may be implemented by a networked mobile wireless telecommunication computing device such as a smartphone or tablet computer; in other embodiments the method 100 may be implemented by server-type data processing systems such as order processing systems associated with a provider.

At step 102, the method 100 obtains an arrival estimate for when a user associated with the order is expected to arrive at the provider location, and at step 106, the method 100 uses the arrival estimate to schedule processing of the order. As described in greater detail below, an arrival estimate may be obtained from a global positioning system (GPS) navigation system, from an address input manually into a data processing system by a user, from wireless triangulation, from information from a local Internet Service Provider (ISP) or by any other suitable technique.

Embodiments of the method 100 in FIG. 1 relying on only a single, initial arrival estimate, without using any estimate relating to how long the order will take to process, may advantageously be used to efficiently schedule the sequence of order processing for multiple users in situations where spoilage or degradation of the goods being prepared is unlikely to be an issue. For example, two users may have submitted orders for substantially non-perishable goods that are to be picked up from a provider location where only a single stock picker is available, and the respective arrival estimates indicate that one user will arrive in ten minutes and the other user will arrive in twenty minutes. The method 100 in FIG. 1 could be used to schedule processing of these two orders, with the order for the user who is ten minutes away being processed before the order for the user who is twenty minutes away. In this embodiment, it is not necessary to update the arrival estimate, since the goods will not spoil or degrade if the arrival estimate is somewhat inaccurate.

Preferably, using the arrival estimate to schedule processing of the order at step 106 comprises using the arrival estimate to schedule processing of the order so that completion of processing of the order is expected to substantially coincide with arrival of the user at the provider location. In one embodiment, the method 100 may determine a processing start time so that arrival of the user is expected to coincide with completion of order processing. For example, where the arrival estimate is a time of day (e.g. 1:47 p.m.) that the user is expected to arrive at the provider location, the method 100 may use the arrival estimate to retrieve a start time for processing the order from a look-up table. The start times in the lookup tables may be based solely on the arrival estimate (time of day), or may be based on the arrival estimate (time of day) and some indication of the size of the order, such as the number of items in the order or the cost of the order. Thus, the lookup table may comprise rows corresponding to times of day (or ranges thereof) and columns corresponding to cost (or ranges thereof) for the order, and the start time may be retrieved from the cell that is in the row corresponding to the arrival estimate and in the column corresponding to the cost of the order.

Figure 1A:
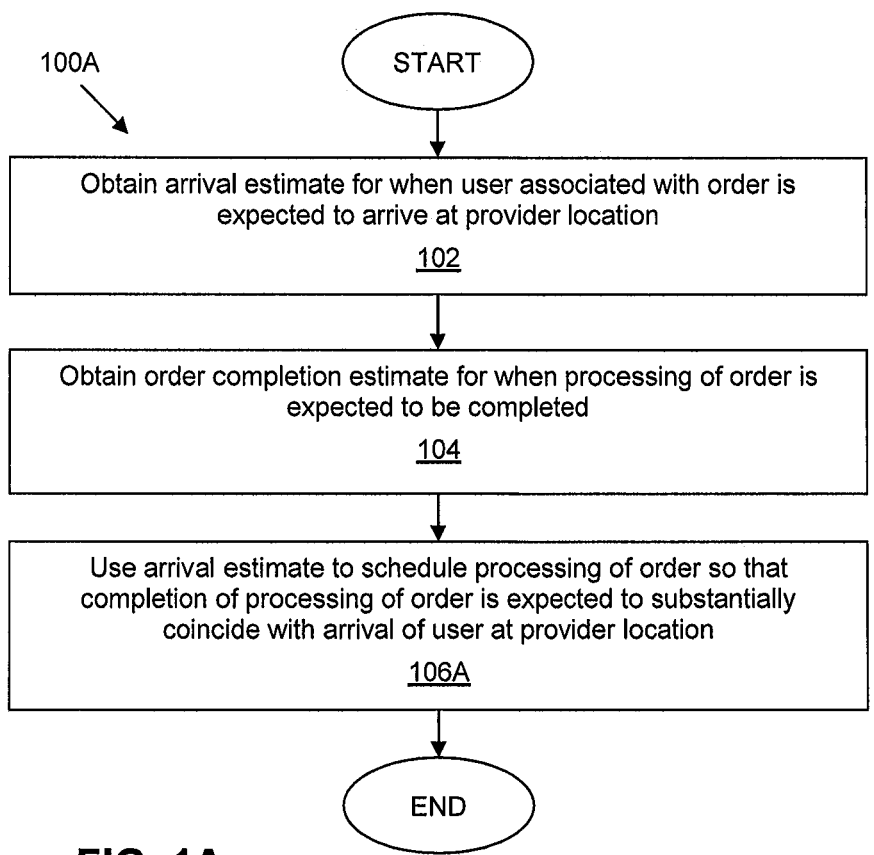
FIG. 1A is a flow chart showing a method that is a particular exemplary embodiment of the method of FIG. 1.

FIG. 1A shows an exemplary method 100A for scheduling processing of an order for goods at a provider location. The method 100A in FIG. 1A is a particular implementation of the method 100 in FIG. 1, with the same reference numerals referring to corresponding steps. The method 100A uses an order completion estimate, in addition to the arrival estimate, to schedule processing of the order so that completion of processing of the order is expected to substantially coincide with arrival of the user at the provider location. Thus, at step 104 the method 100A obtains an order completion estimate for when processing of the order is expected to be completed, and at step 106 the method 100A uses both the arrival estimate and the order completion estimate to schedule processing of the order. The order completion estimate could be a fixed value (e.g. in a fast food restaurant most orders can be completed in less than three minutes), may be obtained from a lookup table based on the size of the order (e.g. number of items or cost of the order), or may be calculated dynamically from the items in the order. Steps 102 and 104 may be performed in any order.

In one embodiment, where the arrival estimate is a time of day and the order completion estimate is a duration (e.g. a number of minutes), processing of the order may be scheduled by simply subtracting the order completion estimate from the arrival estimate. For example, if the arrival estimate is 1:50 p.m. and the order completion estimate is six minutes, processing of the order could be scheduled to begin at 1:44 p.m. so that completion of order processing is expected to coincide with arrival of the user at the provider location at 1:50 p.m. In this embodiment, the arrival estimate and the order completion estimate are not directly compared to one another, and the arrival estimate and the order completion estimate are not updated.

In other embodiments, using the arrival estimate and the order completion estimate to schedule processing of the order (step 106A) comprises comparing the arrival estimate and the order completion estimate and updating at least one of the arrival estimate and the order completion estimate, such that the then-current arrival estimate and the then-current order completion estimate are compared. In cases where the goods being ordered will perish or degrade rapidly once prepared, such as in a quick service or "fast food" restaurant, it may be important to obtain updates to arrival estimate and/or the order completion estimate to enhance precision of the scheduling. Updating of the arrival estimate may be particularly important in this context, as a user may encounter unexpected delays, such as traffic congestion. If only an initial arrival estimate is used, a food order whose preparation was scheduled so that order completion coincides with the original arrival estimate may in fact be spoiled or degraded when a delayed user actually arrives. Additionally, an initial order completion estimate may become inaccurate if not updated, for example if there are significant changes in volume at a provider location, which may create a backlog or a temporary shortage of some items.

Figure 2:
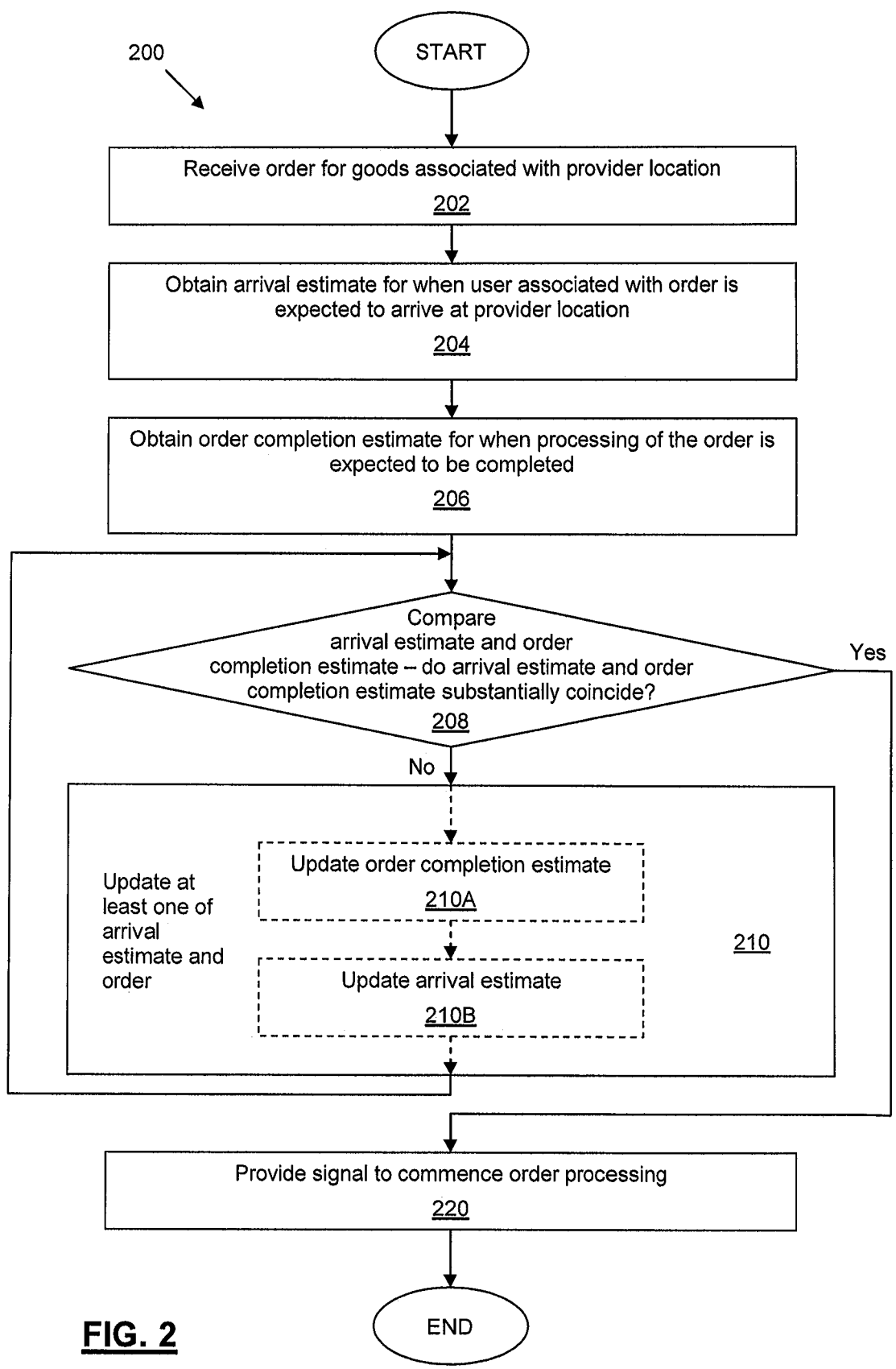
FIG. 2 is a flow chart showing a first exemplary implementation of the method of FIG. 1A.

Reference is now made to FIG. 2, which shows an exemplary method 200 for scheduling processing of an order for goods at a provider location. The exemplary method 200 is a first exemplary implementation of the method 100A of FIG. 1A.

At step 202, an order for goods is received. The order will be associated with a provider location where the order is to be processed, as well as being associated with a user who is to pick up the order. For example, the order may specify the provider location by allowing the user to select from a list of provider locations when submitting the order. The list may be based on the user's present location. In some embodiments, the order may be entered into the user's data processing system, such as a home computer or a networked mobile wireless telecommunication computing device such as a smartphone, and the user's data processing system may complete all of the steps of the method 200. In other embodiments, the order may be received at a data processing system associated with the provider, and the method 200 would be executed by the data processing system associated with the provider. A data processing system associated with a provider may be, for example the order processing system for the provider location that is to process the order for goods, or a central order processing system for a plurality of provider locations (e.g. a restaurant chain having a plurality of locations), or a data processing system of a provider aggregator that processes orders for a plurality of different providers, each of which may have one or more provider locations.

At step 204, which corresponds to step 102 of the method 100A in FIG. 1A, the method 200 obtains an arrival estimate for when the user associated with the order is expected to arrive at the provider location that is processing the order. The arrival estimate is associated with the order for goods received at step 102. The arrival estimate may be, for example, an estimated travel time of the user to the provider location from the user's current location, or an estimated arrival time of the user at the provider location, based on the user's current location. The arrival estimate may be obtained in a number of ways. Typically, the arrival estimate will be based on the user's initial location, using conventional navigation technology such as that used in GPS navigation systems or Internet-based travel calculation systems like Google Maps or MapQuest to determine an estimated travel time (e.g. 15 minutes) to, or estimated time of arrival (e.g. 9:15 a.m.) at, the provider location. Such calculations may take into account factors such as time of day, traffic patterns, and the like, as is known in the art. For example, where the order is initially entered into a GPS-equipped smartphone, the smartphone may use its GPS system to determine the initial location, that is, the current location of the smartphone. The smartphone could then use appropriate software to calculate an initial arrival estimate, which the smartphone could then use in implementing the method 200, or transmit to a data processing system associated with the provider where the method 200 is being implemented by the latter data processing system. Alternatively, where the method 200 is being implemented by a data processing system associated with the provider, the smartphone may simply determine and transmit its current location to the data processing system associated with the provider. Other techniques for obtaining an initial location to use in calculating the arrival estimate include cellular triangulation, determination from ISP data, and manual entry of a location.

At step 206, which corresponds to step 104 of the method 100A in FIG. 1A, the method 200 obtains an order completion estimate for when processing of the order is expected to be completed Like the arrival estimate, the order completion estimate is also associated with the order for goods received at step 102. The order completion estimate may be, for example, an estimated duration of the processing of the order (e.g. 4 minutes), or an estimated completion time for the order (e.g. 12:06 p.m.) given a specified start time for the order when the order processing will be complete. The order completion estimate may be generated in a number of different ways.

As noted above, in some embodiments a fixed value may be used as the order completion estimate. For example, where the method 200 is to be used in conjunction with a fast food restaurant, the order completion estimate may be set to a constant value based on the length of time for preparing a typical order and which will provide an adequate estimate for most cases. Thus, if in a particular fast food restaurant 90% of orders can be completed in three minutes or less, a constant value of three minutes may be used as the order completion estimate. If the order is completed sooner (e.g. one and a half or two minutes) spoilage will not be an issue (as compared to the three minute estimate), and those cases that take longer (e.g. four or five minutes) are unlikely to keep the user waiting for a substantial period of time.

In other embodiments, the order completion estimate may be generated dynamically. A dynamically generated order completion estimate may be based on the time of day, the number and/or type of items ordered, the current staffing level at the relevant provider location, the current volume of business at the relevant provider location, or some combination of the foregoing as well as other relevant factors.

Although FIG. 2 shows step 204 being performed before step 206, in other embodiments step 206 may be performed before step 204.

Steps 208 and 210 together correspond to step 106A of the method 100A shown in FIG. 1. At step 208, the method 200 compares the arrival estimate and the order completion estimate. In response to a determination at step 208 that the arrival estimate and the order completion estimate substantially coincide, the method 200 proceeds to step 220 and provides a signal to commence processing of the order. Step 220 will typically comprise transmitting either the order itself, or a signal to commence processing of the order, to a provider or a particular provider location that will process the order.

Several methodologies may be used to determine whether the arrival estimate and the order completion estimate substantially coincide. In a preferred embodiment, the arrival estimate and the order completion estimate will be considered to substantially coincide when they are within a predetermined threshold from one another, for example one or two minutes. Where both the order completion estimate and the arrival estimate are times of day, or both the order completion estimate and the arrival estimate are time periods (e.g. an estimated processing time and an estimated travel time, respectively), they may be compared directly. Where the arrival estimate and the order completion estimate are in different forms, such as where one is a time of day and the other is a time period, they may be prepared for comparison by converting one to the other. For example, if the arrival estimate is a time period but the order completion estimate is a time of day, the arrival estimate can be converted to a time of day by adding the time period to the current time of day, or the order completion estimate can be converted to a time period by subtracting the current time of day therefrom.

In some instances, a user will be close enough to the provider location that will process the order that it will take longer to process the order than it will for the user to arrive at that provider location. It is therefore preferred that at step 208, the arrival estimate and the order completion estimate are deemed to coincide when comparing the arrival estimate and the order completion estimate indicates that the user associated with the order is expected to arrive at the provider location before the order is expected to be completed. Thus, for example, in response to a determination at step 208 that the estimated processing time for the order is approximately equal to or exceeds the initial estimated travel time, the method 200 would proceed to step 220 and provide a signal to commence processing of the order for goods. This procedure will cause order processing to commence substantially immediately following receipt of the order so as to minimize the amount of time that the user will have to wait.

In response to a determination at step 208 that the arrival estimate and the order completion estimate do not substantially coincide, the method 200 proceeds to step 210 and obtains an updated arrival estimate, an updated order completion estimate, or obtains both an updated arrival estimate and an updated order completion estimate.

Step 210A shows updating of the order completion estimate, and step 210B shows updating of the arrival estimate; when both steps 210A and 210B are carried out these steps may be carried out in any order. Either step 210A or step 210B may be omitted in appropriate circumstances. For example, where the arrival estimate and the order completion estimate are both represented as a time of day, step 210B may be omitted and the arrival estimate may be held constant with only the order completion estimate being updated (step 210A), since the order completion estimate will depend on the time at which processing begins. In this situation, updating the order completion estimate at step 210A would comprise updating the start time upon which the order completion estimate is based. In another example, where the arrival estimate and the order completion are both represented as a time period or duration, step 210A may be omitted and the order completion estimate may be held constant, with only the arrival estimate being updated (step 210B), since the time period that is the arrival estimate in this case will generally decrease as time elapses. In this situation, updating the arrival estimate may comprise decrementing the previous arrival estimate based on the amount of time that has elapsed, i.e. counting down. Thus, where the arrival estimate is an estimated travel time, determining the updated estimated travel time may comprise decrementing a most recent previously estimated travel time by an interval substantially equal to the time elapsed since determination of the most recent previously estimated travel time. Alternatively, updating the arrival estimate may comprise executing a new calculation of the arrival estimate. In such an embodiment, where the arrival estimate is an estimated travel time, obtaining the updated estimated travel time may comprise, in the case of a networked mobile wireless telecommunication computing device, updating the current location, calculating the updated estimated travel time from the updated location, the provider location and an updated travel route between the updated location and the provider location, for example from an onboard GPS system. Where the arrival estimate is an estimated travel time and the method 200 is being executed by a data processing system associated with a provider, updating the estimated travel time by the data processing system may comprise the data processing system querying a mobile wireless telecommunication computing device associated with the user, receiving, in response to the query, an identification of an updated location, and then the data processing system calculating the updated estimated travel time from the updated location, the provider location and an updated travel route between the updated location and the provider location. The updated travel route may be obtained from the mobile wireless telecommunication computing device or determined by the data processing system associated with the provider. The updated travel route will typically be a projected travel route based on the current location of the user, since the actual travel route cannot be known with certainty since it has not yet been taken.

The updated order completion estimate determined at step 210A may be obtained in the same way as the initial order completion estimate determined at step 206. For example, where the order completion estimate is a obtained from a lookup table based on a given start time for the order, updating the order completion estimate may comprise accessing the same lookup table again using the then-current start time. Similarly, updating of the order completion estimate at step 210A may comprise dynamically recalculating the order completion estimate in embodiments where the order completion estimate is generated dynamically, such as where the order completion estimate may change due to the volume of business at a particular provider location, for example. Alternatively, the updated order completion estimate at step 210A may be determined in a different way than the initial order completion estimate obtained at step 206.

Similarly, the updated arrival estimate determined at step 210B may be obtained in the same way as the initial arrival estimate determined at step 204, such as by obtaining a dynamically recalculated arrival estimate. In one embodiment, a dynamically updated location for the user, such as from a GPS-equipped smartphone, may be used to generate an updated arrival estimate in the same way that the original arrival estimate was generated. For example, the user's updated location may indicate that the user has deviated from the anticipated route upon which the previous arrival estimate was based. In other embodiments, the updated arrival estimate determined at step 210B may be obtained in a different way than the initial arrival estimate obtained at step 204. For example, the initial arrival estimate obtained at step 204 may be an estimated travel time dynamically calculated, such as from a GPS or manually entered location, and may be updated simply by decrementing according to elapsed time. Such an approach may be used, for example, if the order is transmitted from a desktop computer and is not associated with a networked mobile wireless telecommunication computing device. In addition, updating an initial arrival estimate by decrementing may also be used as a "fallback" procedure in the case where dynamic recalculation is the primary procedure but such dynamic recalculation fails, for example if the networked mobile wireless telecommunication computing device is disconnected from its network or the battery is exhausted. In such circumstances, where the connection to the networked mobile wireless telecommunication computing device is determined to have failed, the method 200 may begin decrementing the last known arrival estimate. Alternatively, step 210B may be performed in more than one way, such as by generating a dynamically updated arrival estimate based on new GPS location data on every $X^{th}$ update while decrementing the previous estimate for the other updates.

After updating either the order completion estimate or the arrival estimate or both at step 210, the method 200 returns to step 208 to again compare the order completion estimate and the arrival estimate to see if they substantially coincide. Thus, the second and subsequent iterations of step 208 compare the then-current arrival estimate to the then-current order completion estimate, with at least one, and possibly both, of the then-current arrival estimate and order completion estimate being an updated arrival estimate and order completion estimate, respectively. Alternatively, in the second and subsequent iterations of step 208 the then-current arrival estimate may be the initial arrival estimate with only the order completion estimate being updated, or the then-current order completion estimate may be the initial order completion estimate, with only the arrival estimate being updated.

Optionally, a delay, for example one minute, may be interposed between steps 208 and 210 to limit the use of processing resources; that is, the order completion estimate and/or the arrival estimate would be updated periodically at fixed intervals rather than constantly.

Figure 2A:
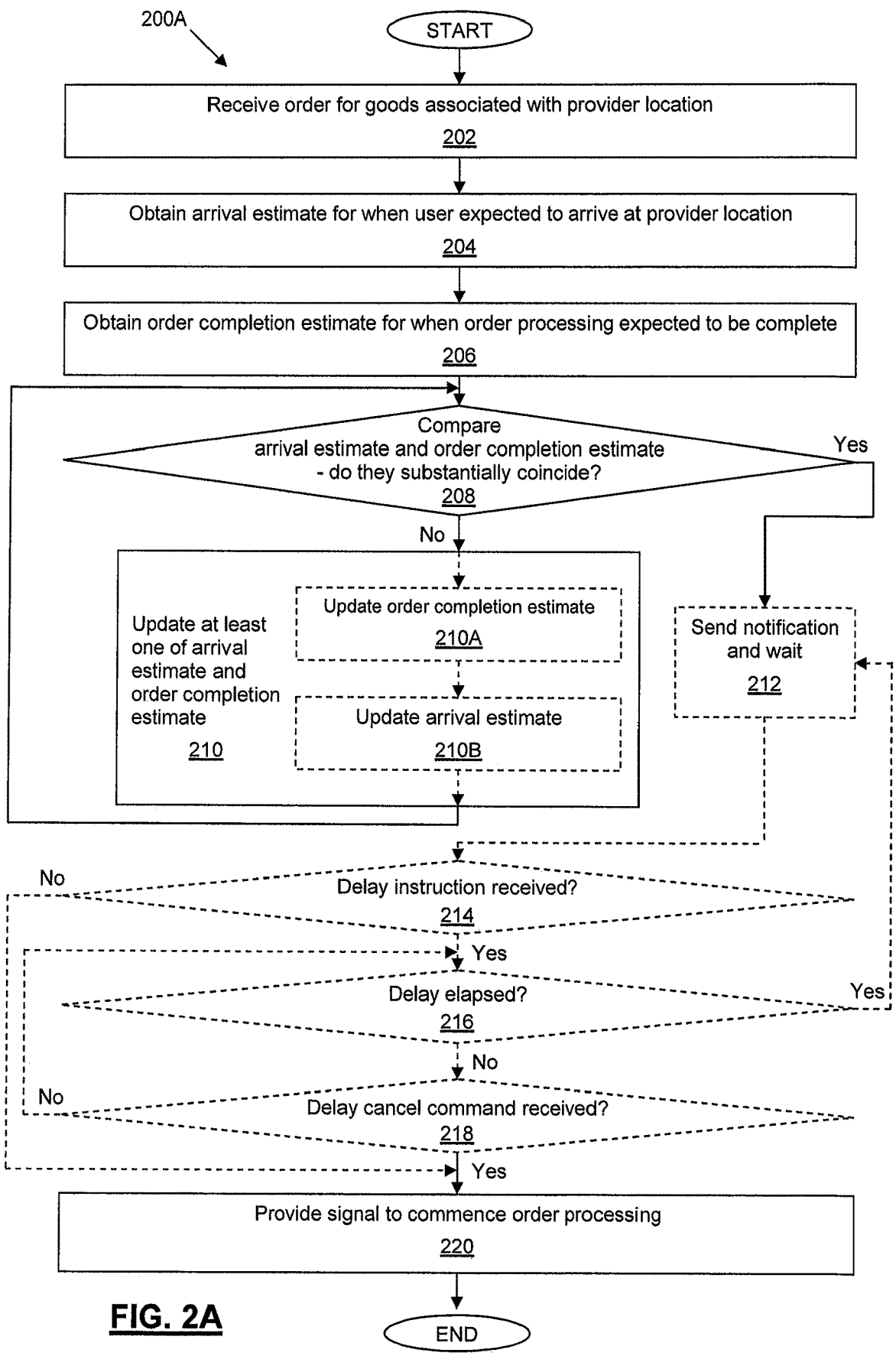
FIG. 2A is a flow chart showing a second exemplary implementation of the method of FIG. 1A.

FIG. 2A shows another exemplary method 200A for scheduling processing of an order for goods at a provider location. The method 200A shown in FIG. 2A is similar to the method 200 shown in FIG. 2, with like reference numerals identifying corresponding steps, and includes additional optional steps 212 to 218 (shown with dashed lines) for providing notification to a user and allowing a user to delay the commencement of order processing, for example if the user is caught in traffic or decides to stop unexpectedly.

In the method 200A shown in FIG. 2A, after a determination at step 208 that the arrival estimate and the order completion estimate substantially coincide, instead of proceeding immediately to step 220 to provide the signal to commence order processing, the method 200A proceeds to step 212 and sends a notification to the user that order processing is about to begin, and then waits for a predetermined time to give the user an opportunity to provide a delay instruction, which may be a fixed or a variable, user-selected delay. The method 200A then proceeds to step 214 to check whether a delay instruction has been received from the user. Responsive to a determination at step 214 that no delay instruction has been received, the method 200A proceeds to step 220 and provides the signal to commence order processing.

If the method 200A determines at step 214 that a delay instruction has been received, the method then proceeds to step 216 to check whether the delay has elapsed. If the method 200A determines at step 216 that the delay has elapsed, the method 200A returns to step 212 to send a further notification to the user and give the user an opportunity to provide a further delay instruction. If the method 200A determines at step 216 that the delay has not yet elapsed, then the method 200A proceeds to step 218 to check whether a command to cancel the delay instruction has been received. Responsive to a determination at step 218 that no delay cancel command has been received, the method 200 returns to step 216 to again check whether the delay has elapsed. If the method 200A determines at step 218 that a delay cancel command has been received, then the method 200A proceeds to step 220 and provides the signal to commence order processing.

While FIG. 2A shows step 218 occurring after step 216, these steps may be performed in the reverse order; i.e. the method 200A could check for a delay cancel command before checking if the delay has elapsed, or steps 216 and 218 may be performed substantially simultaneously. In some embodiments, the user may not be provided with an opportunity to cancel a delay instruction, in which case step 218 may be omitted. In some embodiments, a user may only be permitted to provide a single delay instruction, in which case (if a delay cancel option is provided) step 218 would precede step 216 and the method 200A may proceed directly from step 216 to step 220 when it is determined that the delay has elapsed.

Figure 3A:
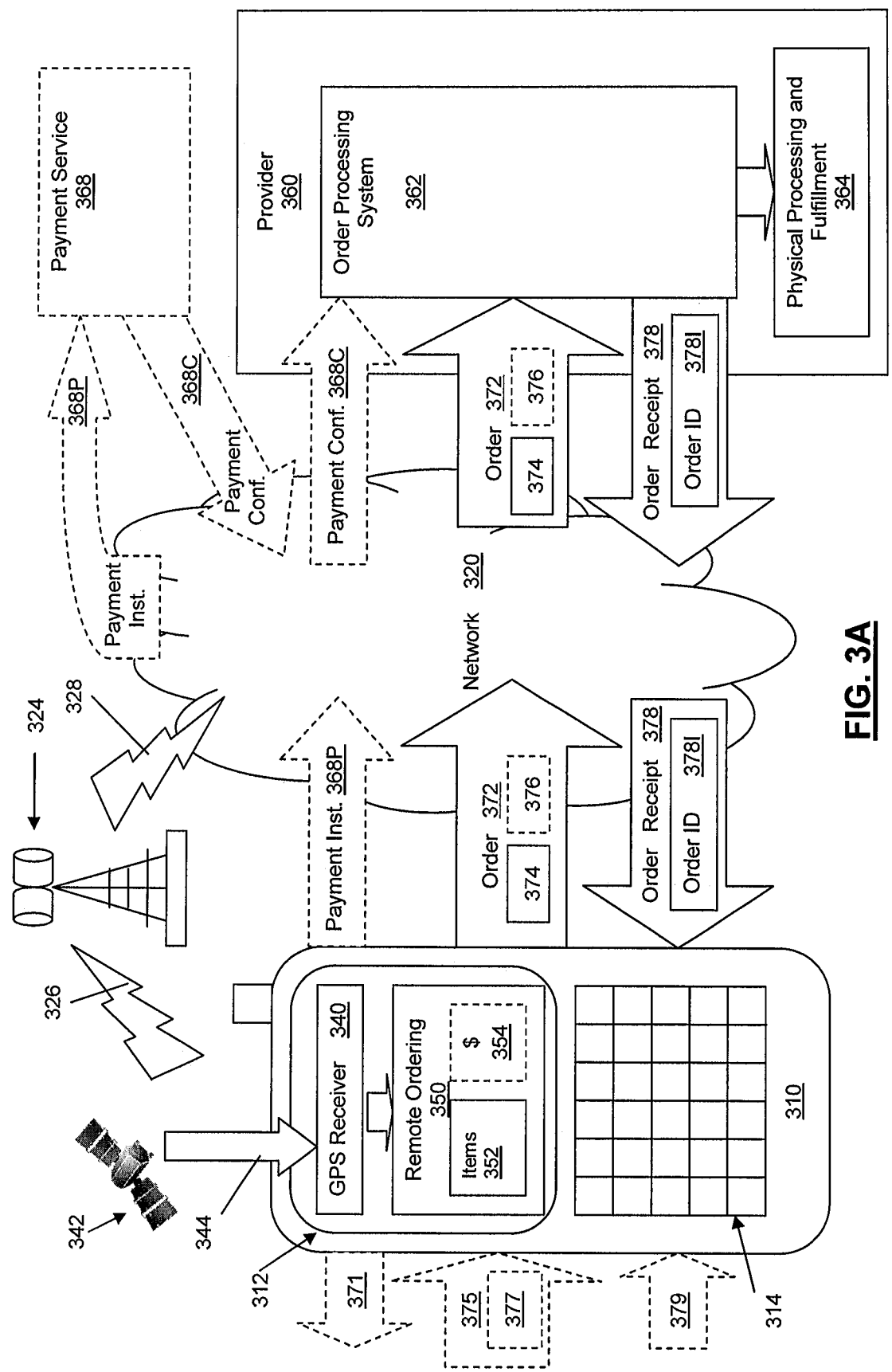
FIG. 3A shows a schematic representation of a first exemplary arrangement for implementing a method for scheduling processing of an order by a provider.

FIG. 3A shows a schematic representation of a first exemplary arrangement for implementing a method for scheduling processing of an order by a provider. As shown in FIG. 3A, a networked mobile wireless telecommunication computing device in the form of a smartphone 310 has a display 312 and user interface 314 in the form of a keyboard. In the illustrated embodiment, the display 312 and user interface 314 are separate; in other embodiments the display and user interface may be integrated into a single, touch-sensitive interactive screen, as is known in the art, and the keyboard may be omitted. The smartphone 310 is in communication with a network 320, such as the Internet or a private network, by way of a wireless telecommunication system 324 represented schematically by a wireless transmission tower. The wireless telecommunication system 324 exchanges wireless communication signals 326 with the smartphone 310, and also exchanges communication signals 328 with the network 320, thereby enabling the smartphone 310 to communicate with the network 320. The communication signals 328 between the wireless telecommunication system 324 and the network 320 may be wired or wireless.

The smartphone 310 is equipped with a locating system, which in the illustrated embodiment is a global positioning system ("GPS") receiver 340 that receives signals 344 from orbiting satellites 342 and, either directly or in cooperation with a processor of the smartphone 310, determines the position of the smartphone 10. For simplicity of illustration only a single satellite 342 is shown, in operation a plurality of satellites 342 are used in a global positioning system, as is known in the art.

In the embodiment shown in FIG. 3A, the method 200 from FIG. 2 is implemented by the smartphone 310. The smartphone 310 includes a remote ordering application 350 in the form of computer-readable data and instructions stored in the memory (not shown in FIG. 3A; see FIG. 9) of the smartphone 310 for execution by the processing unit (see FIG. 9) of the smartphone 310. The remote ordering application 350 enables a user (not shown in FIG. 3A) of the smartphone 10 to generate an order for goods, and includes an item list 352 and optionally includes payment support 354. The remote ordering application 350 may be, for example, a separate application program installed on the smartphone 310 or may be a page or pages within a web browser application on the smartphone 310. The item list 352 will generally comprise a list of items available from a provider 360 (discussed further below), prices associated with each item on the item list 352, and possibly additional information about the items. For example, where the provider 360 is a restaurant or a chain of restaurants, the item list 352 would typically comprise at least a list of menu items and the prices of those menu items, and possibly images and/or descriptions of the menu items. The item list 352 can be maintained remotely and transmitted to the smartphone 310 in response to a request, or the item list 352 may be stored on the smartphone 10 and be periodically updated, for example when updating a remote ordering application.

The optional payment support 354 is used by the remote ordering application 350 to make payment for an order for goods generated by the remote ordering application 350. In one embodiment, the payment support 354 enables a user to enter payment information, such as a credit card number or a prepaid value card number, at the time an order is generated; in another embodiment the payment support 354 stores payment information for reuse. In a further embodiment, the payment support 354 links to an external payment service 368, such as that provided by PayPal, having an address at 2211 North First Street, San Jose, California 95131, to facilitate payment for an order. Such linking may be direct, or may be via a separate application program provided by the external payment service 368 and stored on the smartphone 310. In another embodiment, a data processing system associated with the provider 360 may store payment information. For example, a person may establish a user account with a provider 360, which account may include identifying information for the person as well as enabling information for one or more payment methods, such as a credit card, bank account or prepaid value storage, that can be used to pay for goods either upon receipt of an order or upon collection of the goods by a user. In such embodiments, the payment support 354 may be used to select among multiple payment methods, or the payment support 354 may be omitted entirely, such as where there is only a single payment method or the user will select a payment method when collecting the goods at the provider location 366. In other embodiments, the remote ordering application 350 may not include any payment support 354 and payment may be made in any conventional manner when the user collects the goods at the provider location 366. Because the payment support 354 and the use of the external payment service 368 is optional, the payment support 354 as well as the external payment service 368 and the communications 368P, 368C therewith are shown in dashed lines in FIG. 3A.

In the embodiment illustrated in FIG. 3A, the remote ordering application 350 is distributed by a provider 360 who makes goods available for sale, lease, rental and the like. For example, the provider 360 may be, without limitation, a restaurant, or a retailer such as a grocery store, general merchandise store, liquor or beer store or a video rental store. The provider 360 may have any number of individual locations at which goods may be provided to a user, ranging from a single location to thousands of locations. The locations may be owned by the provider, or may be franchises of the provider, or some combination thereof. The provider 360 has an order processing system 362 for receiving and processing orders for goods generated by the remote ordering application 350 and received via the network 320, and then dispatching the orders for physical processing and fulfillment 364 at a physical provider location 366 (see FIG. 4) operated by the provider 360. The order processing system 362 will typically be a server-type data processing system, which may comprise one or more individual computer systems coupled to the network 320. The order processing system 362 may be a central order processing system that communicates with the point-of-sale order processing systems at individual physical provider locations 366, or the provider locations 366 may be provided with a computer system or terminal linked to the order processing system 362 to display incoming orders. Typically, the physical provider location 366 is a retail outlet. Where the provider 360 operates a plurality of such provider locations 366, the order processing system 362 will route the order to the appropriate provider location 366. The provider location 366 may be selected based on the current location of the smartphone 310, a destination location or a planned travel route, in each case with the user being asked to confirm the provider location 366. Alternatively, the user may manually enter a desired provider location 366. Certain provider locations 366 may also be stored as "favorites" for frequent use.

In operation, in the embodiment shown in FIG. 3A a user will use the remote ordering application 350 to generate an order 372 for goods that are available from the provider 360; the order is received in the smartphone 310, thereby fulfilling step 202 of the method 200 shown in FIG. 2 and the method 200A shown in FIG. 2A. In the exemplary embodiment shown in FIG. 3A, the order 372 includes an identification 374 of the type and quantity of goods being ordered as well as payment information 376. The payment information 376 may be a credit card number and associated information, or may comprise an indication that payment instructions 368P were sent to an external payment service 368 associated with the smartphone 310. In other embodiments, where permitted by the order processing system 362, an order for goods need not include payment information, and in such circumstances may include other information, such as a telephone number or other identifier for the smartphone 310. In embodiments in which the order 372 does not include payment information 376, the user can pay for the goods at the time of collection at the provider location 366, or a user's credit card, bank account or a prepaid value storage may be automatically charged once the user has collected the goods.

The smartphone 310 then obtains an order completion estimate for the order 372 (step 206 of the method 200 shown in FIG. 2 and the method 200A shown in FIG. 2A). The order completion estimate may be calculated by the smartphone 310 based on information stored in the remote ordering application 350, or alternatively (not shown in FIG. 3A) the smartphone 310 may transmit information about the items to be ordered (but not the order 372 itself) to the order processing system 362 and receive the order completion estimate from the order processing system 362.

After the order 372 has been generated, at the appropriate time, as explained in greater detail below, the order 372 is transmitted by the smartphone 310 through the network 320 to the order processing system 362 operated by the provider 360. Where the order 372 includes payment information 376, the order processing system 362 processes the payment information 376 and, responsive to successful processing of the payment information 376, transmits an order receipt 378 to the smartphone 310. Where the payment information 376 is a credit card number and associated information, the order processing system 362 can process this information in a known manner, and the order receipt 378 may be transmitted to the smartphone 310 using the remote ordering application 350, via e-mail to an e-mail account associated with the smartphone 310, by text message to a phone number associated with the smartphone, or by other suitable technique. Where the payment information 376 indicates that payment instructions 368P were sent to an external payment service 368, the order processing system will receive and verify payment confirmation 368C from the external payment service 368 and, once payment is verified, transmit the order receipt 378 via the network either directly to the smartphone 310 as shown in FIG. 3A, or to the external payment service 368 for transmission by the external payment service 368 to the smartphone 310. In embodiments where the order 372 does not include payment information 376, such as where the goods are to be paid for upon collection at the provider location 366, the payment processing steps may be omitted although an order receipt 378 will typically still be transmitted to confirm placement of the order even though it does not confirm payment. The order receipt 378 preferably includes an order identifier 378I so that the order receipt 378 can be connected to the order 372. For example, the order identifier 378I can be a numeric, alphabetic or alphanumeric code and/or can repeat the identification 374 of the type and quantity of goods from the order 372. Alternatively, the order identifier 378I can be a bar code or quick-response (QR) code. After receiving the order receipt 378, the smartphone 310 can store, retrieve and reproduce the order receipt 378, for example by presenting the order receipt 378 on the display 312. In permitted cases where the order 372 does not include payment information 376, a separate payment confirmation can be transmitted once payment has been processed.

After successful processing of the payment information 376, or in a permitted case where no payment information is provided, the order processing system 362 processes the order 372 and routes it for physical processing and fulfillment 364 at a physical location 366 (see FIG. 4). Typically, in the case where the provider 360 operates a plurality of physical locations 366, the order 372 will specify the physical location 366 where physical processing and fulfillment 364 should occur and hence from where the goods should be collected.

In the exemplary arrangement shown in FIG. 3A, the smartphone 310 will obtain an initial arrival estimate (step 204 of the method 200/200A in FIG. 2/FIG. 2A) for when the user is expected to arrive at the physical provider location 366 where the order is to be processed, using the GPS receiver 340 or other locating system. The smartphone 310 does not transmit the order 372 immediately after the order is generated, but only when the smartphone 310 determines that the arrival estimate for the user substantially coincides with the order completion estimate for the order 372 (i.e. step 208 of the method 200/200A in FIG. 2/FIG. 2A). Thus, in the exemplary embodiment shown in FIG. 3A, transmission of the order 372 is step 220 of the method 200 shown in FIG. 2 and the method 200A shown in FIG. 2A, and the smartphone 310 implements step 208 of the method 200/200A in FIG. 2/FIG. 2A by using the GPS receiver 340 or other locating system to determine when the smartphone 310 is in an appropriate geographical location such that the estimated remaining travel time of the user 370 to the physical location 366 from which the goods are to be collected is approximately equal to the time required to complete the physical processing and fulfillment 364 of the goods. As such, the smartphone 310 will obtain periodic updates of the arrival estimate (step 210B of the method 200/200A in FIG. 2/FIG. 2A) using the GPS receiver 340 or other locating system, and may also obtain updates of the order completion estimate from the order processing system 362 (step 210A of the method 200/200A in FIG. 2/FIG. 2A; not shown in FIG. 3A). Because transmission of the order 372 is based on the location of the user and his or her smartphone 310, the order 372 is part of, and hence associated with, a location-triggered communication from the smartphone 310, and the provider 360 processes the order 372 in response to that location-triggered communication.

Figure 3B:
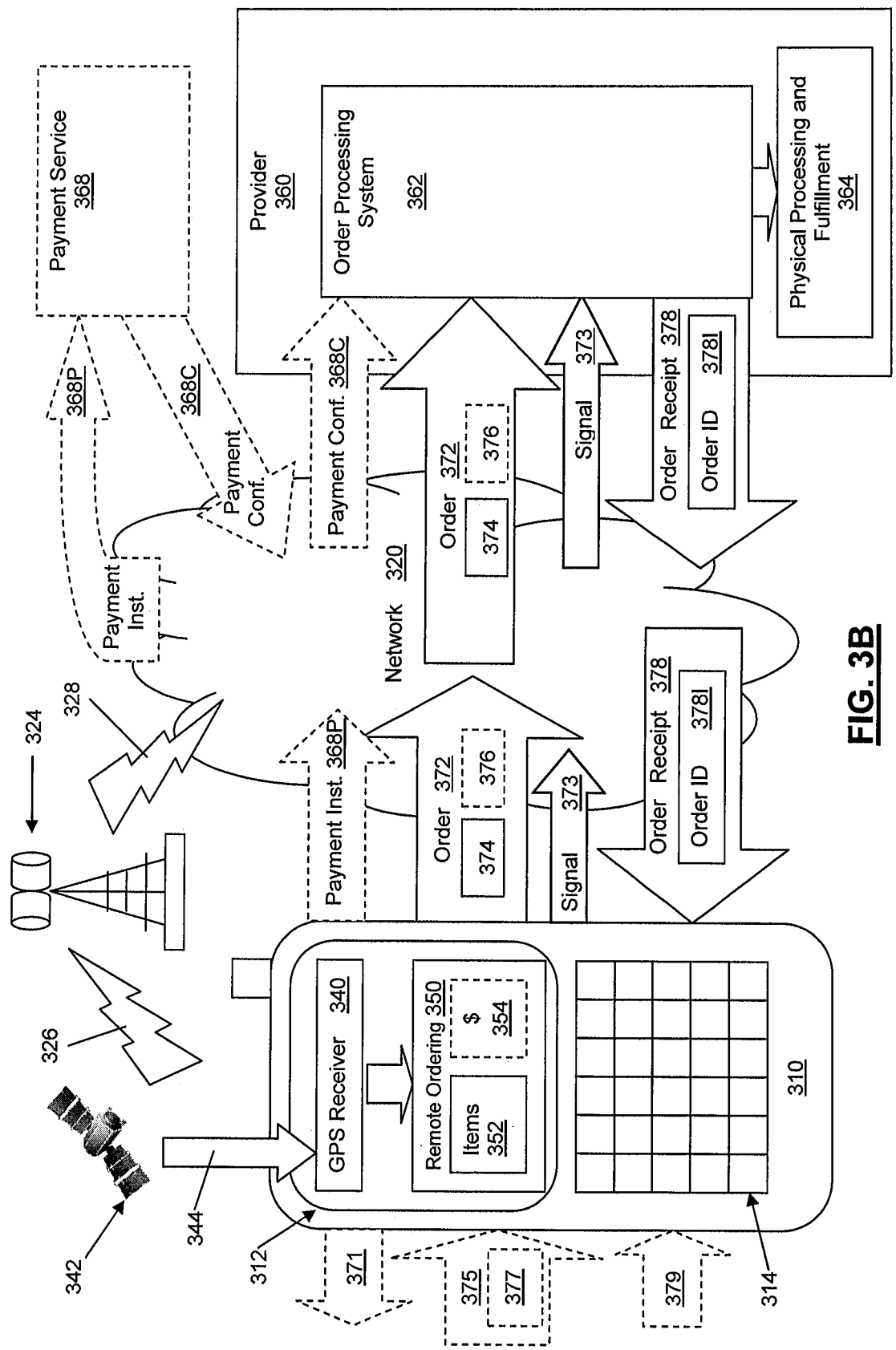
FIG. 3B shows a schematic representation of a second exemplary arrangement for implementing a method for scheduling processing of an order by a provider.

An alternate embodiment of the arrangement in FIG. 3A is shown in FIG. 3B. In this alternate embodiment, instead of waiting to transmit the order 372 until the estimated processing time for the order 372 is approximately equal to the estimated remaining travel time to the relevant provider location 366, the order 372 is transmitted by the smartphone 310 in advance. In such an embodiment, while the payment information 376 may be processed and the order receipt 378 sent immediately, physical processing and fulfillment 364 of the order 372 will be held in abeyance until the smartphone 310 transmits a separate communication or signal 373 to the provider 360 signaling that processing should begin (step 220 of the method 200 in FIG. 2). Thus, the location-based communication may be associated with the order 372 by containing the order 372, as shown in FIG. 3A, or may be a separate communication 373 that is associated with the order 372, for example by means of a suitable order identifier, as shown in FIG. 3B. The order completion estimate may be calculated by the smartphone 310, or may be sent to the smartphone 310 from the order processing system 362, which can use the order 372 to generate the order completion estimate. The arrangement shown in FIG. 3B is otherwise similar to the arrangement shown in FIG. 3, and hence like reference numerals are used to refer to like features.

In embodiments such as the one shown in FIG. 3B where the order 372 is transmitted ahead of time, the provider 360 may carry out some initial physical processing steps upon receiving the order 372 while holding the final processing steps in abeyance until the order processing system 362 receives the signal 373. Typically, the initial physical processing steps would be those that are not critical to issues of freshness, spoilage or degradation and the final processing steps held in abeyance Would be those that will have an effect on freshness, spoilage or degradation if not timed correctly. For example, where the order 373 is for a pizza, the provider 360 may prepare the pizza in response to the order 372, but not cause the pizza to be placed in the oven until the order processing system 362 receives the signal 373 indicating that the user's travel time is approximately equal to the cook time for the pizza. Thus, the signal 373 to commence processing the order 372 may be a signal to commence a final stage of processing.

Optionally, the smartphone 310 provides a notification 371 (step 212 of the method 200A in FIG. 2A) before transmitting the order 372 (FIG. 3A) or the signal 373 (FIG. 3B) to the order processing system 362 signaling that processing should begin. Also optionally, the smartphone 310 allows the user to provide a delay instruction 375 to the smartphone 310 to delay transmission of the order 372 (FIG. 3) or the signal 373 (FIG. 3B). This relates to steps 214, 216 and 218 of the method 200A in FIG. 2A. The delay instruction 375 may be for a set period of time (e.g. 5 or 10 minutes), or the user may specify a time period 377 in the delay instruction 375. The sequence of notification 371 and delay instruction 375 may operate recursively, i.e. following expiration of the time period 377 specified by the previous delay instruction 375, the smartphone 10 may provide a further notification 371 providing the user with an opportunity to provide a further delay instruction 375. The notification 371 may be an audible notification, a visual notification or an audiovisual notification, and the delay instruction 375 may be provided by voice command or by keyboard or touchscreen input. The delay instruction 375 may be provided in response to the notification 371, or independently, for example to cause the notification 371 or the signal 373 to be sent a set period of time after the time that the notification 371 or the signal 373 would ordinarily be sent based on the location of the smartphone 310. Also optionally, the smartphone 310 can receive a cancel delay command 379 to cancel a previously received delay instruction 375.

Figure 3C:
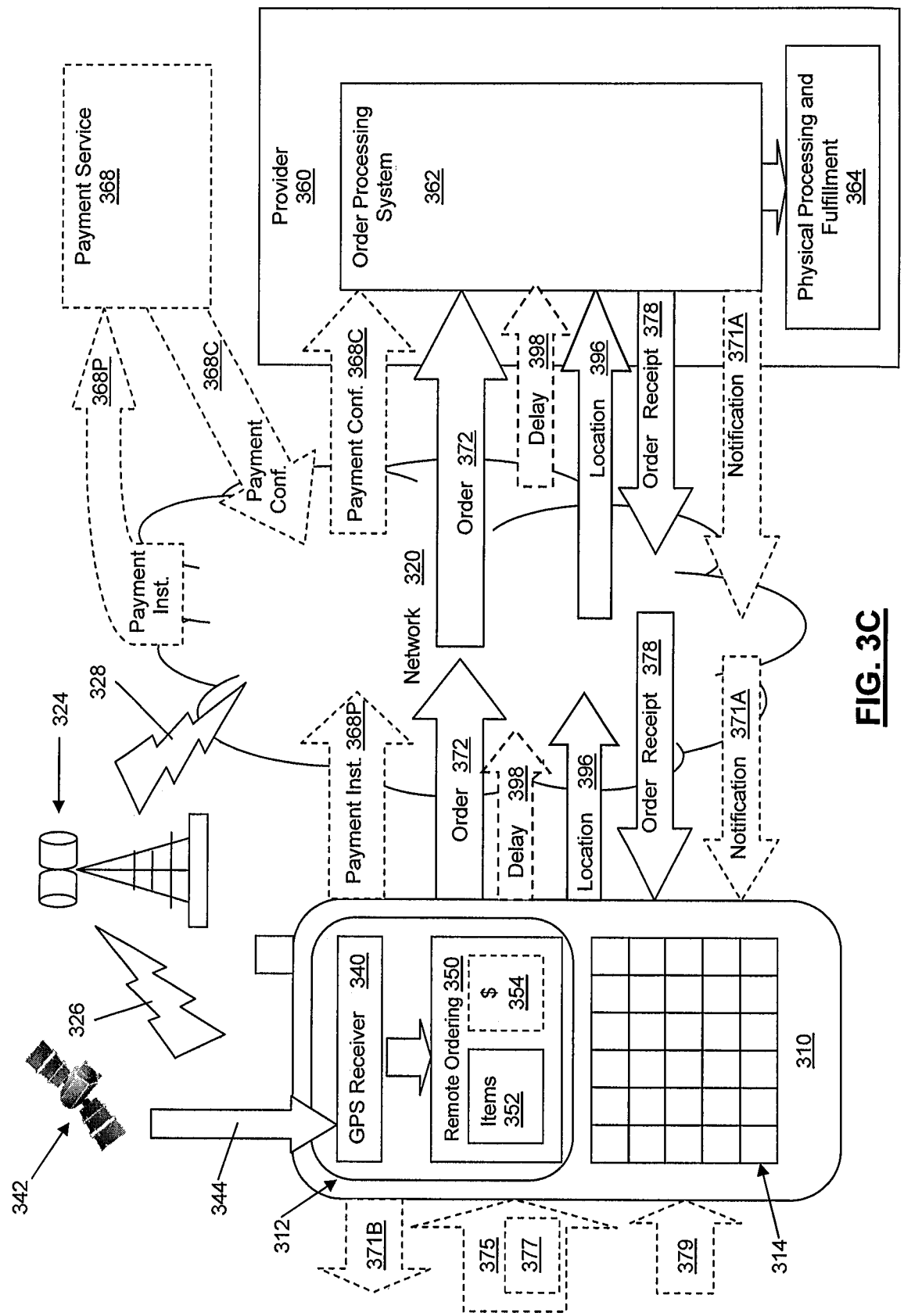
FIG. 3C shows a schematic representation of a third exemplary arrangement for implementing a method for scheduling processing of an order by a provider.

Reference is now made to FIG. 3C, which shows another alternate embodiment of a method for processing an order. The embodiment shown in FIG. 3C is similar to the embodiments shown in FIGS. 3A and 3B, with like reference numerals referring to like features, but in the embodiment shown in FIG. 3C the method 200/200A from FIG. 2/FIG. 2A is executed by the order processing system 362 rather than the smartphone 310.

In the embodiment shown in FIG. 3C, the smartphone 310 transmits the order 372 to the order processing system 362 (the identification 374 of the type and quantity of goods being ordered as well as payment information 376 are included in the order 372 and are omitted from FIG. 3C for simplicity of illustration only). In the embodiment shown in FIG. 3C, receipt by the order processing system 362 of the order 372 is step 202 of the method 200/200A in FIG. 2/FIG. 2A. The smartphone 310 also transmits location information 396, obtained from the GPS receiver 340 or other locating system, to the order processing system 362, either without prompting or in response to a query from the order processing system 362. In a preferred embodiment, the location information 396 comprises an initial arrival estimate calculated by the GPS receiver 340 or other locating system, in which case receipt of the location information 396 at the order processing system is step 204 of the method 200/200A in FIG. 2/FIG. 2A. Alternatively, the location information 396 may simply comprise a then-current location of the smartphone 310, in which case step 204 of the method 200 will comprise the order processing system 362 determining an initial arrival estimate based on the location information 396. The order processing system 362 will also execute step 206 of the method 200/200A in FIG. 2/FIG. 2A, for example by using a predetermined order completion estimate or by calculating the order completion estimate from the order 372. In an alternate embodiment, the remote ordering application 350 on the smartphone may embed an initial order completion estimate in the order 372 and the order processing system 362 may obtain the order completion estimate by extracting it from the order 372.

The order processing system 362 then executes step 208 of the method 200/200A in FIG. 2/FIG. 2A. If the order processing system 362 determines that the arrival estimate and the order completion estimate substantially coincide, the order processing system 362 will execute step 220 of the method 200/200A in FIG. 2/FIG. 2A and send a signal to commence processing of the order, for example by sending instructions to a particular provider location. The signal sent at step 220 of the method 200/200A in FIG. 2/FIG. 2A may be internal to the order processing system 362.

If the order processing system 362 determines that the arrival estimate and the order completion estimate do not substantially coincide, then the order processing system 362 will update one or both of the order completion estimate (step 210 of the method 200/200A in FIG. 2/FIG. 2A) and the arrival estimate and then again compare the arrival estimate and the order completion estimate (step 208 of the method 200/200A in FIG. 2/FIG. 2A), continuing this cycle until the order processing system 362 determines that the order completion estimate and the arrival estimate do substantially coincide.

Updating the arrival estimate by the order processing system 362 may comprise receiving updated location information 396 from the smartphone 310, either in response to a query from the order processing system 362 or with the location information 396 being sent automatically, such as periodically, from the smartphone 310. In such embodiments, the updated location information 396 may comprise an updated arrival estimate calculated by the GPS receiver 340 or other locating system, in which case step 210B of the method 200/200A in FIG. 2/FIG. 2A is fulfilled by receipt of the location information 396 at the order processing system 362. If the location information 396 is an updated location of the smartphone 310, step 210B of the method 200/200A in FIG. 2/FIG. 2A will comprise the order processing system 362 determining an updated arrival estimate based on the updated location information 396. The order processing system may also update the order completion estimate (step 210A of the method 200/200A in FIG. 2/FIG. 2A), for example based on updated information about queues and latency at the particular provider location that will process the order 372.

Optionally, in a manner similar to the embodiments shown in FIGS. 3A and 3B, the embodiment shown in FIG. 3C may provide for the user to receive a notification before physical processing and fulfillment 364 of the order 372 begins and be given an opportunity to delay physical processing of the order 372. In the embodiment shown in FIG. 3C, before beginning physical processing and fulfillment 364 of the order 372, the order processing system 362 would send a notification signal 371A to the smartphone 310 (step 212 of the method 200A of FIG. 2A), and the smartphone 310 would, in response to the notification signal 371A, provide a notification 371B to the user and allow the user to enter into the smartphone 310 a delay instruction 375, which may be for a set period of time (e.g. 5 or 10 minutes), or may specify a time period 377. The smartphone 310 would then send a delay signal 398 to the order processing system 362, in response to which the order processing system 362 would delay transmitting the signal to commence processing of the order 372. This relates to steps 214, 216, and 218 of the method 200A in FIG. 2A. Similarly to the embodiments shown in FIGS. 3A and 3B, in the embodiment shown in FIG. 3C the sequence of notification signal 371A, notification 371B, delay instruction 375 and delay signal 398 may operate recursively, i.e. following expiration of the time period 377 specified by the previous delay instruction 375, the order processing system 362 may provide a further notification signal 371A and the smartphone 310 may then provide a further notification 371B, thereby enabling the user to provide a further delay instruction 375. As in the embodiments shown in FIGS. 3A and 3B, in the embodiment shown in FIG. 3C, the smartphone 310 can receive a cancel delay command 379 (step 218 of the method 200A shown in FIG. 2) to cancel a previously received delay instruction 375, in which case the smartphone 310 would send a delay cancellation signal (not shown) to the order processing system 362.

In certain other embodiments, the order 372 may be sent from a different networked computing device than the user's networked mobile wireless telecommunication computing device, such as a computer's home computer or office computer. In such embodiments, the user's networked mobile wireless telecommunication computing device would still provide either a signal 373 to commence processing, or location information 396 to enable the order processing system 362 to determine when to commence processing. For example, a user could use his or her office computer to submit the order 372 that he or she intends to pick up on the way home from work. In such embodiments, the order may be prepared and sent using a web page operated by the provider 360.

Figure 3D:
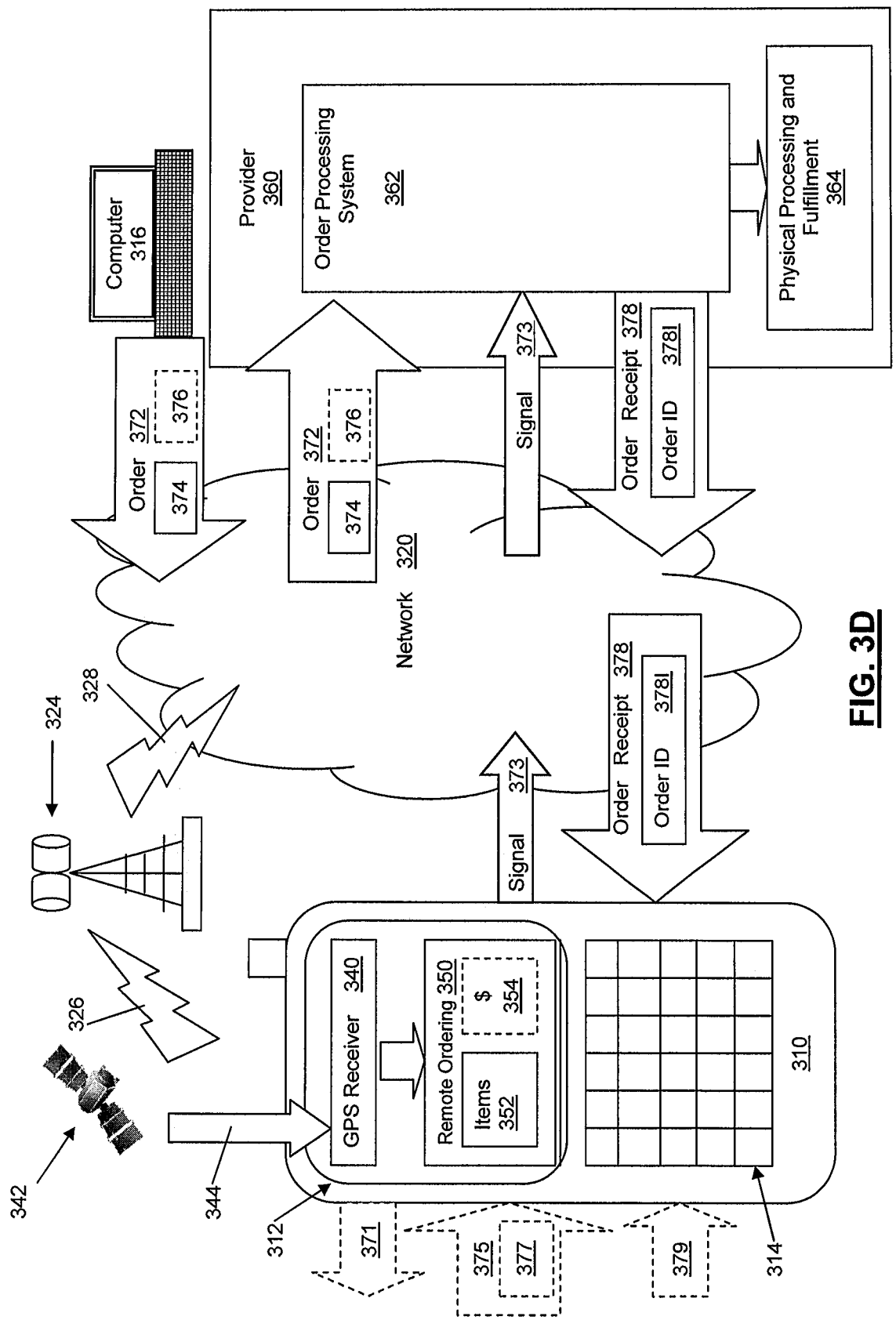
FIG. 3D shows a schematic representation of a fourth exemplary arrangement for implementing a method for scheduling processing of an order by a provider.
Figure 3E:
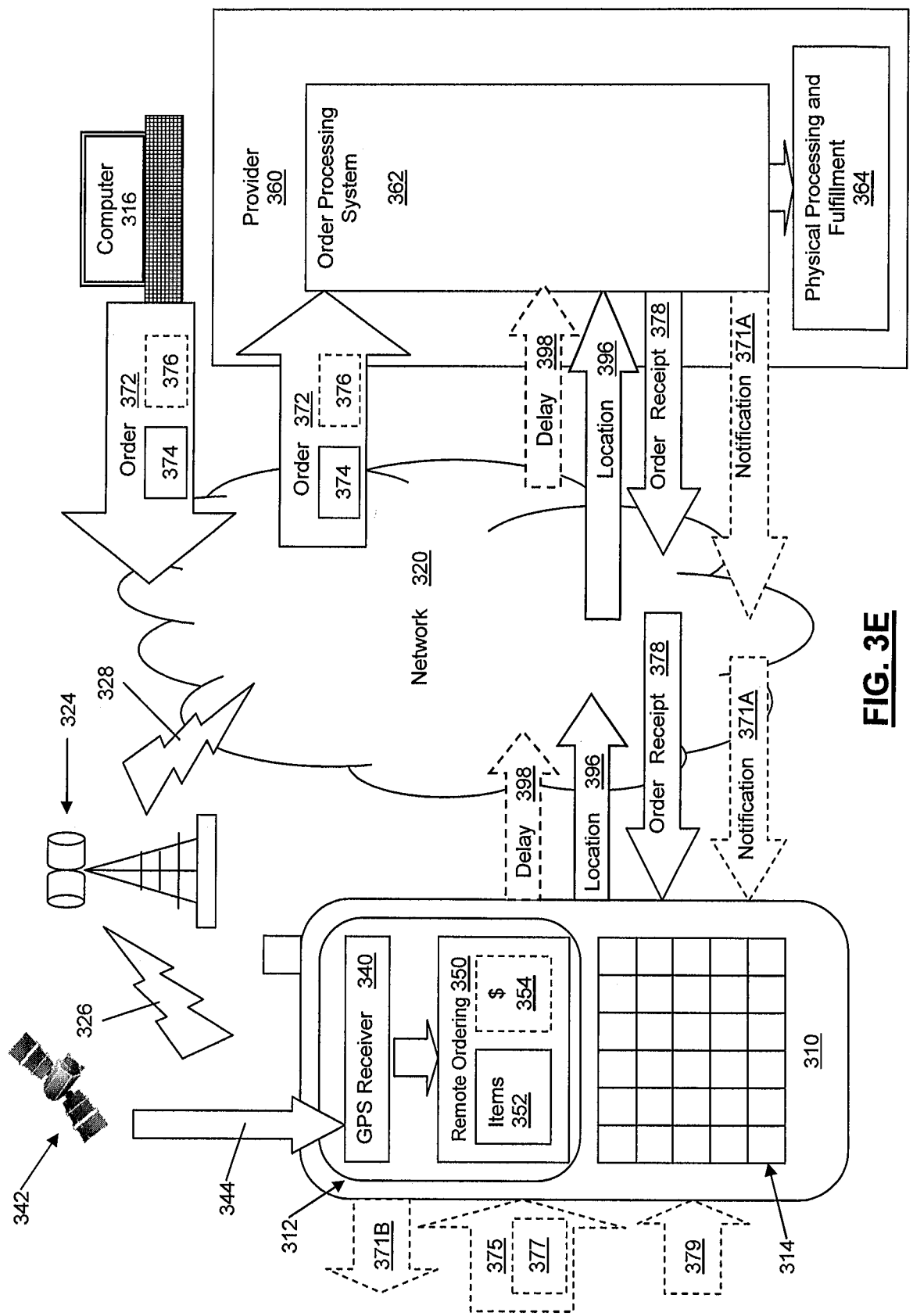
FIG. 3E shows a schematic representation of a fifth exemplary arrangement for implementing a method for scheduling processing of an order by a provider.

FIGS. 3D and 3E show arrangements similar to those in FIGS. 3B and 3E, respectively, except that the order 372 is sent from a user's desktop computer 316 to the provider 360. The payment instructions can be sent from the desktop computer 316 with the order 372, or may be sent separately from the smartphone 310, for example with the signal 373. Simply for ease of illustration, the payment service 368, payment instructions 368P and payment confirmation 368C are not shown in FIGS. 3D and 3E although they may be present in practice. The order receipt 378 is sent to the remote ordering application 350 on the smartphone 310 to facilitate transmission of the signal 373 (FIG. 3D) or the location information 396 (FIG. 3E) by the smartphone 310.

Figure 4A:
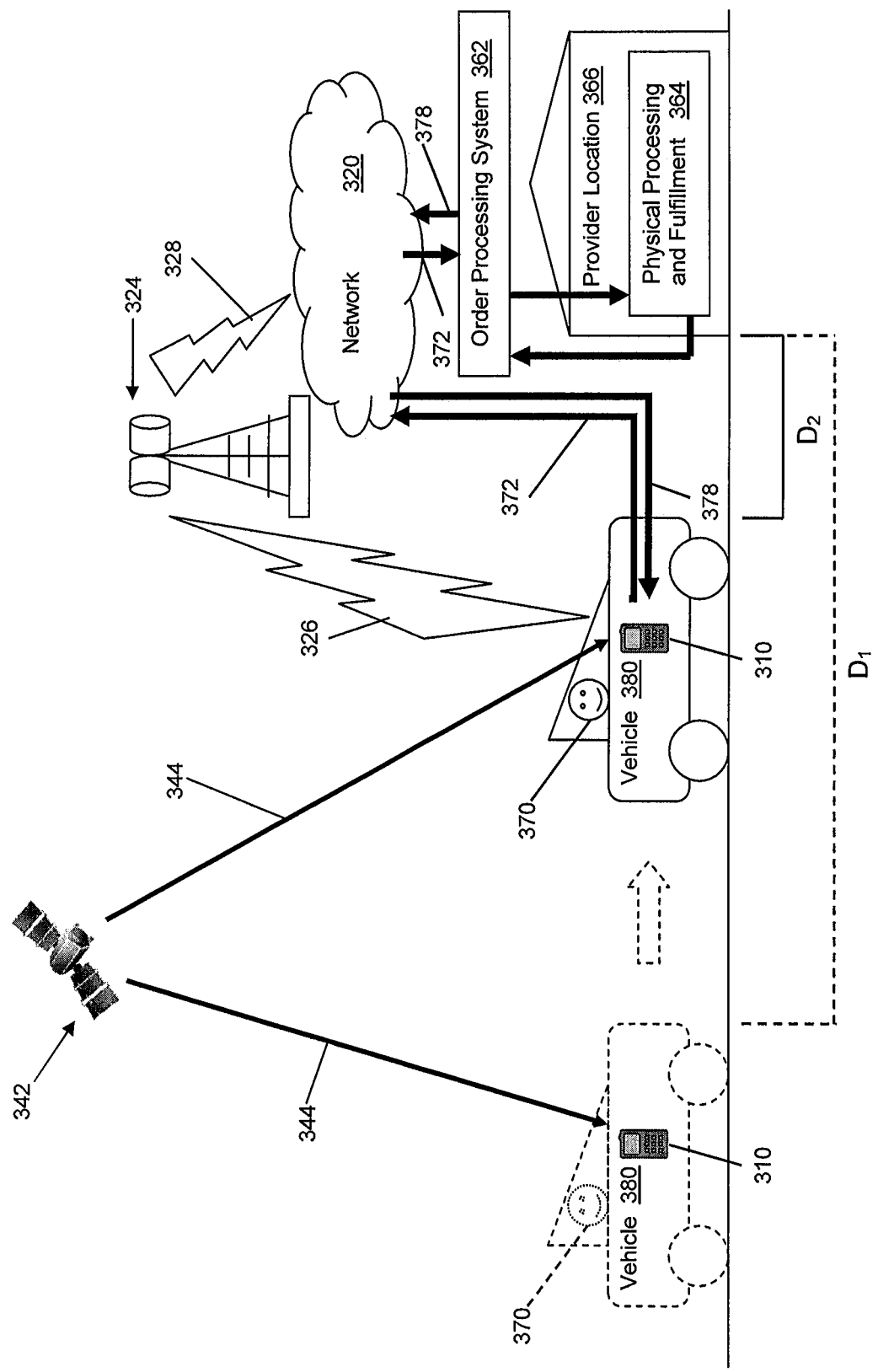
FIG. 4A shows schematically the operation of a communication process for the embodiment shown in FIG. 3A.

Reference is now made to FIG. 4A, which shows schematically the operation of a communication process for the arrangement shown in FIG. 3A. A user 370 has generated an order 372 using the remote ordering application 350 on his or her smartphone 310, and then entered his or her vehicle 380 and started driving to the provider location 366 from which the goods are to be collected. As the user 370 begins driving, the user 370, and hence the smartphone 310, are a first distance $D_1$ from the provider location 366, as determined by the GPS receiver 340 (Figure A) using the signals 344 from the satellites 342. The distance $D_1$ is such that the estimated remaining travel time for the user 370 and vehicle 380 to arrive at the provider location 366 is greater than the estimated processing time for the order 372. As such, in the embodiment shown in FIGS. 3A and 4A, the order 372 is stored in memory of the smartphone 310 but has not yet been transmitted to the order processing system 362 through the network 320.

As the user 370, vehicle 380 and smartphone 310 travel toward the provider location 366, the estimated travel time is updated, continuously or periodically, and compared to the estimated processing time for the order 372 by the smartphone 310. When the user 370, vehicle 380 and smartphone 310 are a second distance D2 from the provider location 366, which is less than the distance $D_1$, the estimated travel time remaining to arrive at the provider location 366 is approximately equal to the estimated processing time for the order 372; that is, the arrival estimate and the order completion estimate substantially coincide. The remote ordering application 350 then transmits the order 372 to the order processing system 362, via the network 320. The order processing system 362 then processes the payment information 376 and sends the order receipt 378 and also causes physical processing and fulfillment 364 of the order 372 at the appropriate provider location 366 to commence.

Figure 4B:
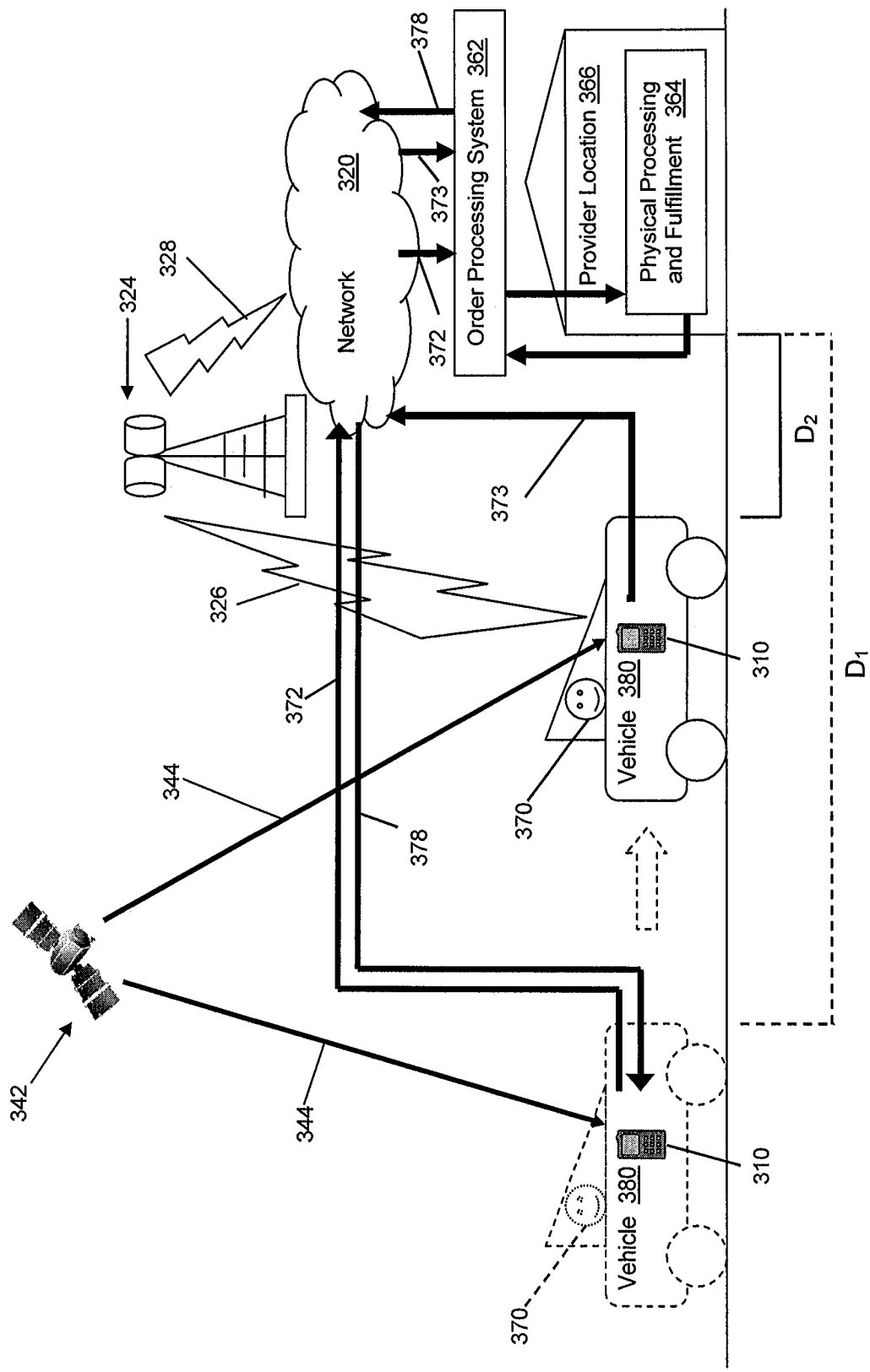
FIG. 4B shows schematically the operation of a communication process for the embodiment shown in FIG. 3B.

FIG. 4B shows schematically the operation of the location-triggered communication process for the arrangement shown in FIG. 3B, and is identical to FIG. 4A, with like reference numerals used to refer to like features, except that in FIG. 4B the order 372 is transmitted, payment processed and the order receipt 378 returned shortly after being entered into the smartphone 310, with a separate signal 373 to commence processing to be transmitted later. In the embodiment shown in FIGS. 3B and 4C, the order 372 is transmitted while the user 370, and hence the smartphone 310, are a first distance $D_1$ from the provider location 366, where the distance $D_1$ is such that the estimated remaining travel time for the user 370 and vehicle 380 to arrive at the provider location 366 is greater than the estimated processing time for the order 372; that is, the arrival estimate and the order completion estimate do not substantially coincide. As such, the signal 373 to commence processing has not yet been transmitted to the order processing system 362. When the user 370, vehicle 380 and smartphone 310 are at the second distance D2 from the provider location 366 where the arrival estimate and the order completion estimate substantially coincide, the remote ordering application 350 then transmits the signal 373 to commence processing to the order processing system 362. For the arrangement shown in FIG. 3D, the operation of the location-triggered communication process is the same as that shown in FIG. 4B, except that the order 372 is transmitted by the user's desktop computer 316 instead of the user's smartphone 310, as shown in FIG. 4D.

Figure 4C:
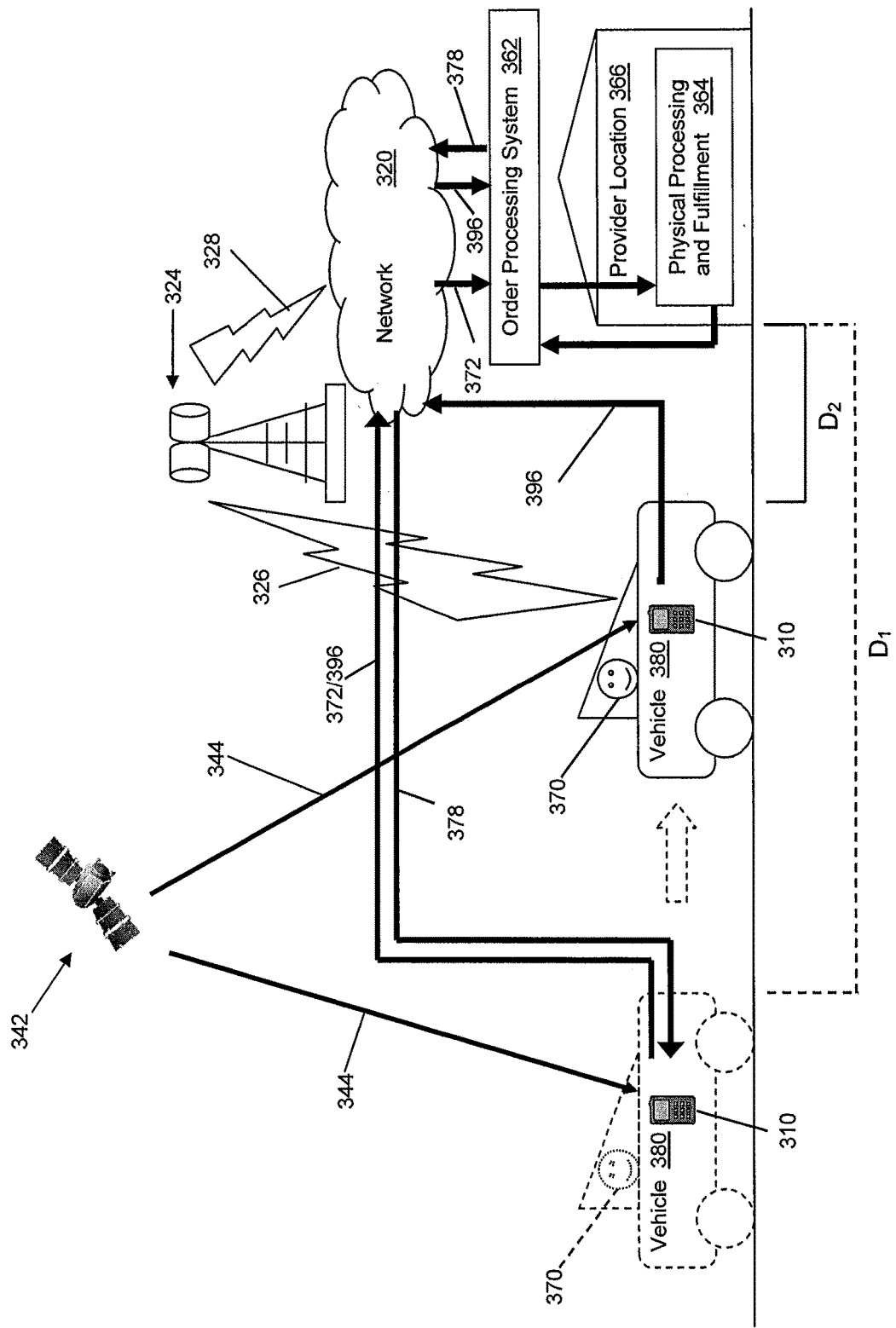
FIG. 4C shows schematically the operation of a communication process for the embodiment shown in FIG. 3C.
Figure 4D:
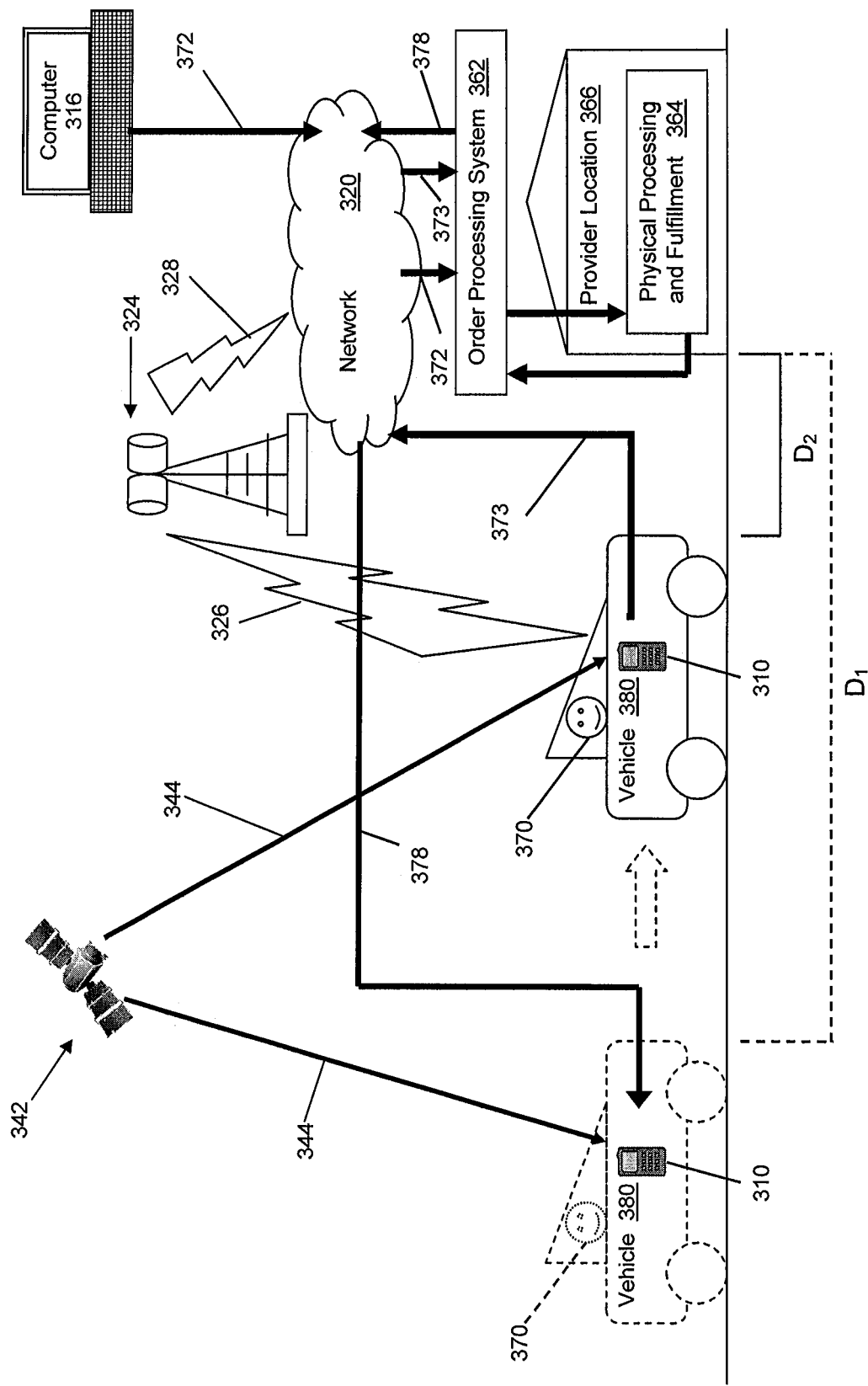
FIG. 4D shows schematically the operation of a communication process for the embodiment shown in FIG. 3D.
Figure 4E:
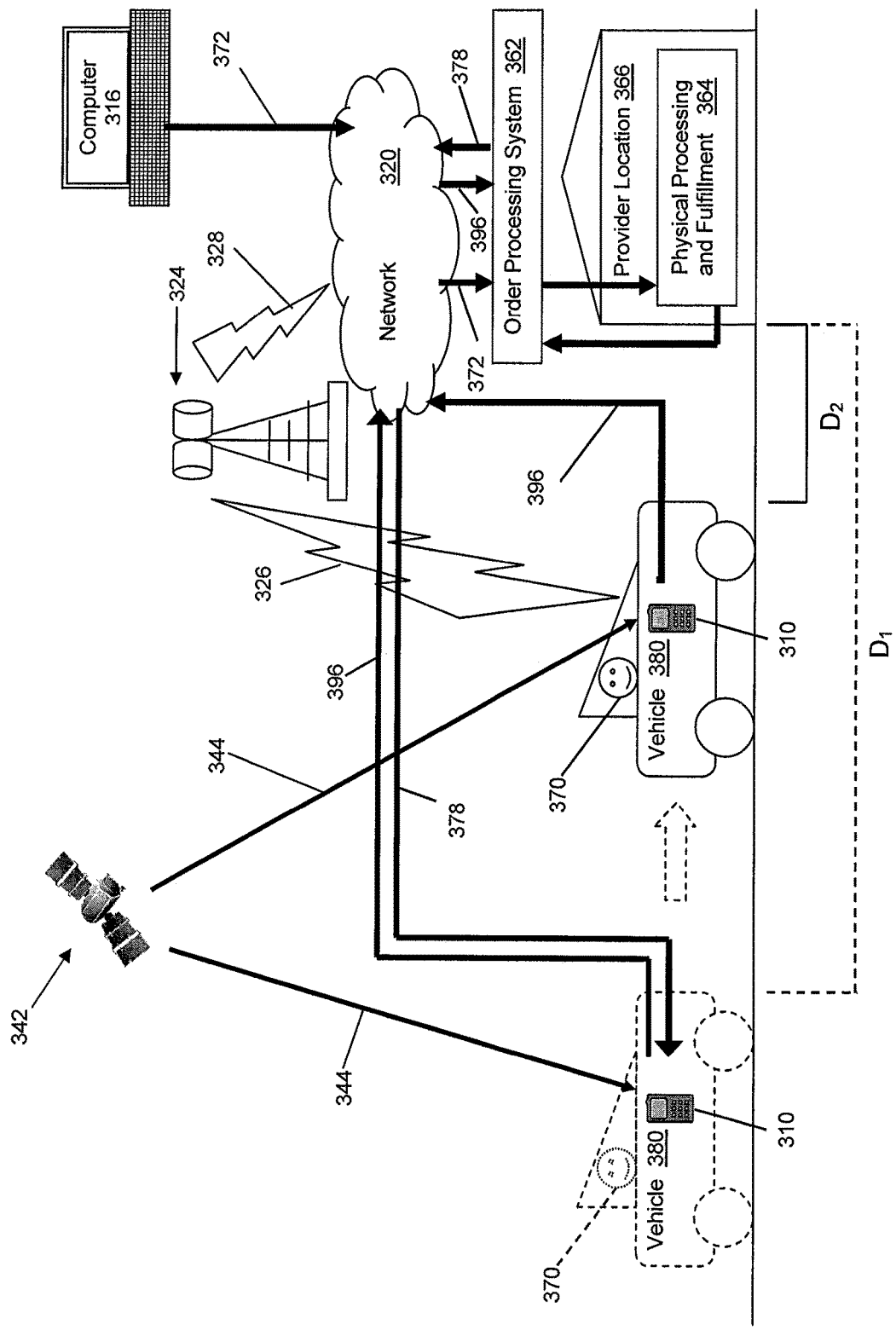
FIG. 4E shows schematically the operation of a communication process for the embodiment shown in FIG. 3E.

FIG. 4C shows schematically the operation of the location-triggered communication process for the arrangement shown in FIG. 3C, in which the method 200/200A from FIG. 2/FIG. 2A is executed by the order processing system 362 rather than the smartphone 310. FIG. 4C is similar to FIG. 4B, with like reference numerals used to denote like features, except that instead of transmitting a signal 373 to commence processing to the order processing system 362, the smartphone 310 sends location information 396 to the order processing system 362. Initial location information 396 is transmitted with the order 372, which is sent when the user 370, and hence the smartphone 310, are a first distance $D_1$ for which the arrival estimate and the order completion estimate do not substantially coincide, and the smartphone 310 continues to send location information 396 as the user 370 and smartphone 310 approach the provider location 366. When the location information 396 enables the order processing system 362 to determine that the arrival estimate and the order completion estimate substantially coincide, i.e. at distance D2, the order processing system 362 sends the signal for the provider location 366 to commence processing of the order. For the arrangement shown in FIG. 3E, the operation of the location-triggered communication process is the same as that shown in FIG. 4B, except that the order 372 is transmitted by the user's desktop computer 316 instead of the user's smartphone 310 and the smartphone 310 only transmits location information 396, as shown in FIG. 4E.

Because processing of the order 372 is delayed until receipt of a location-triggered communication sent when the estimated processing time for the order 372 is approximately equal to the estimated travel time to the provider location 366, the user 370 will generally arrive at the provider location at about the same time as physical processing and fulfillment 364 of the order 372 is completed. As a result, in most circumstances, when the user 370 arrives at the provider location 366, physical processing and fulfillment 364 of the order 372 will either be about to be completed, or have just been completed, so that there is very little waiting by the user 370 for the goods or by the goods for the user 370. This is particularly important where the quality of the goods deteriorates quickly over time, such as with restaurant meals, and can also reduce the amount of time that a user waits in line, as compared to the case where the user places the order upon arrival at the provider location. As such, although these methods are not limited to these establishments, certain systems, methods and computer program products described herein have particular application in respect of "fast food" type restaurants and coffee and donut shops. For example, a remote order can be placed in advance as described above, specifying a drive through pick-up, and the user could simply drive up to the window, present the order receipt 378 and pick up the order, rather than having to drive up, stop to order, stop to pay and then stop and wait for the order to be assembled. Where the order identifier 3781 for the order receipt 378 comprises a bar code or a QR code, the user could present the order receipt 378 by presenting the bar code or QR code on the display 312 of the smartphone 310 to be scanned by a suitable scanning device at the provider location 366. This enables the provider location 366 to queue the orders and ensure that the right orders go to the right users. Additionally, a remote order for a "sit-down" type restaurant can be placed in advance using the systems and methods described above, such that the meal, or the first course, will be ready at approximately the time at which the user and his or her companions, if any, are seated.

In one exemplary embodiment, a user who regularly visits a coffee shop for morning coffee on the way to work would use the remote ordering application 350 to generate their order 372 before leaving home, and as the user gets close enough to the coffee shop, the order would be sent and payment executed so that all the user would have to do is pick up the order, thereby circumventing the line. The remote ordering application 350, or a web site of the provider 360 accessed from a desktop computer 316, can enable creation of a "regular" order, such as the daily coffee order described above, which would be automatically transmitted when the user gets close enough to the relevant provider unless cancelled by the user. For example, when the user first activates the smartphone 310 on a given day, the remote ordering application 350 can remind the user of the "regular" order and present the user with the option to cancel it for that day. Such a "regular" order can be set to operate only on certain days, such as weekdays for the coffee shop example described above.

The provision of a notification 371 and the ability of a user to provide a delay instruction 375 allows for flexibility to adapt to unexpected events. For example, a user may find that he or she is in heavier than expected traffic such that the estimated travel time to the provider location 366 will be inaccurate, or may decide to do an errand on the way to the provider location, and can use the delay instruction 375.

The methods, systems and computer program products described herein are not limited to restaurant applications, and may also be used for other retailers, such as a beer or liquor retailer. Certain of the methods, systems and computer program products described herein, although not limited thereto, may have particular application in respect of a grocery store, where an order may contain certain items that require refrigeration and may degrade or perish if the order is left out for too long after being assembled while also containing other items that could be degraded if placed in refrigeration.

Figure 5A:
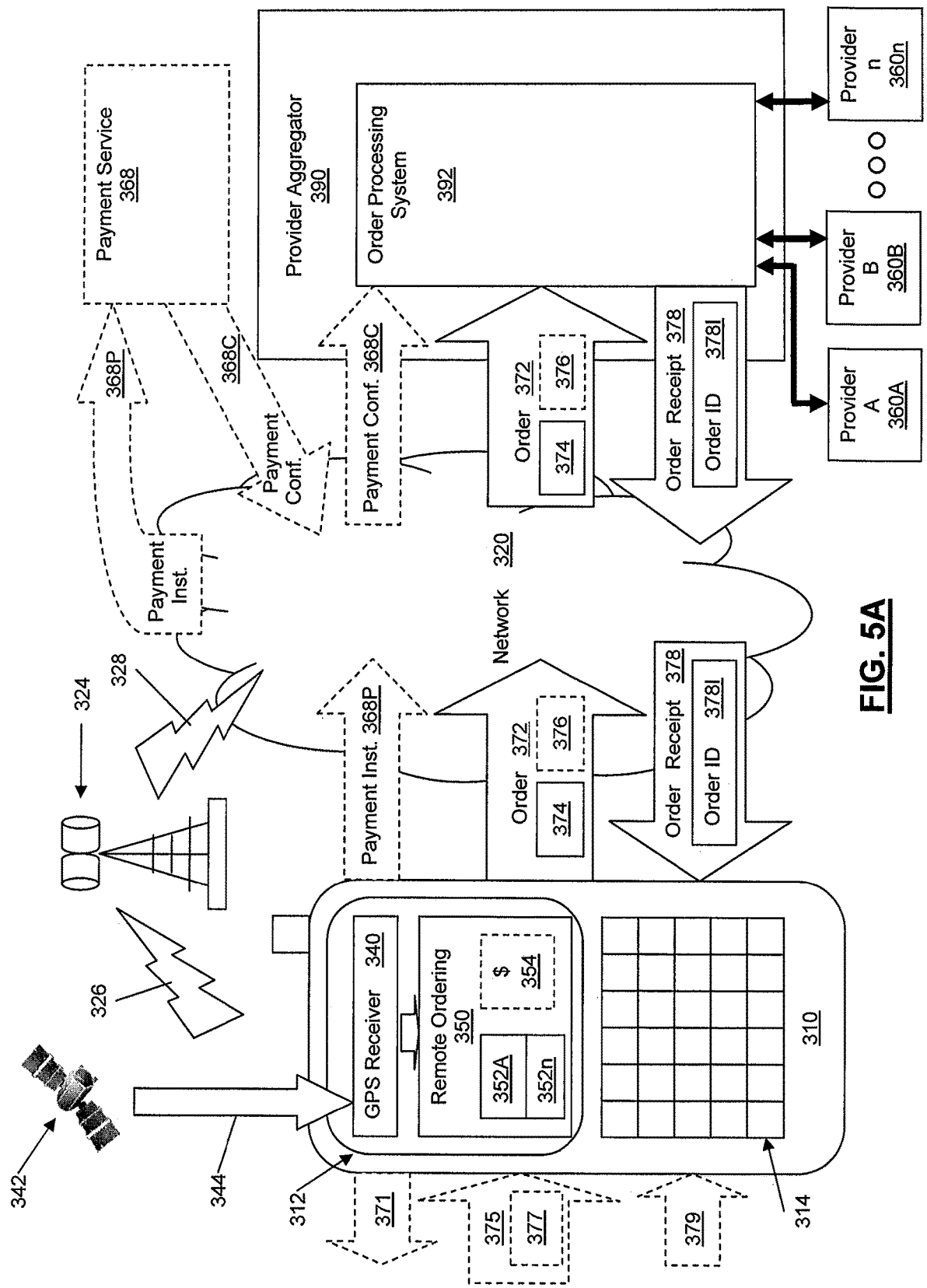
FIG. 5A shows a schematic representation of a first exemplary arrangement for implementing a method for scheduling processing of an order by a provider aggregator.

FIG. 5A shows a schematic representation of another exemplary arrangement for implementing a method for processing an order. The arrangement shown in FIG. 5A is similar in many respects to the exemplary arrangement shown in FIG. 3A, and like reference numerals are used to refer to corresponding features.

In the exemplary arrangement shown in FIG. 5A, the remote ordering application 350 is distributed by a provider aggregator 390 instead of by an individual provider 360. The provider aggregator 390 maintains relationships with a plurality of providers 360A, 360B . . . 360$n$ and aggregates the offerings of goods by those providers 360A, 360B . . . 360$n$ through its own order processing system 392. Like the order processing system 362 of the provider 360, the order processing system 392 of the provider aggregator 390 will typically be a server-type data processing system, which may comprise one or more individual computer systems coupled to the network 320. Details of the providers 360A, 360B . . . 360$n$ are omitted from FIG. 5A for clarity of illustration, but will generally comprise a provider order processing system, one or more provider locations, and facilities for physical processing and fulfillment of orders. The order processing system 392 of the provider aggregator 390 will be coupled, for example via the network 320, to the order processing systems of the providers 360A, 360B . . . 360$n$.

By aggregating a plurality of providers 360A, 360B . . . 360$n$ the provider aggregator 390 can enable a user to place orders with one or more of a plurality of providers 360A, 360B . . . 360$n$ using a single interface, such as a single web site accessed from a desktop computer 316 or a single remote ordering application 350, which will typically include a plurality of item lists 352A . . . 352$n$, one for each provider 360A, 360B . . . 360$n$. For example, where the providers 360A, 360B . . . 360$n$ are restaurants or restaurant chains, the remote ordering application 350 could present a list of restaurants or restaurant locations within a chain and, responsive to one of the restaurants being selected, then present the item list 352A . . . 352$n$, typically a form of menu, for that restaurant or location, enabling a user to generate the order 372. At the appropriate time, the order 372 is transmitted through the network 320 to the order processing system 392 of the provider aggregator 390 and the payment information 376 processed, and the order 372, or at least the identification 374 of the goods ordered, is routed to the appropriate provider 360A, 360B . . . 360$n$ for physical processing and fulfillment, typically via the order processing system of the respective provider.

Payment arrangements for the provider aggregator 390 are similar to those for the case of an individual provider 360, and may provide for processing of payments by the provider aggregator 390, either on an order-by-order basis or via a pre-established user account, or via an external payment service 368. In such embodiments, the provider aggregator 390 will typically have an arrangement by which the providers 360A, 360B . . . 360$n$ receive the payments processed by the provider aggregator, possibly with a deduction of a service charge by the provider aggregator 390. Alternatively, a user may make payment directly to the provider 360, for example on an order-by-order basis, through a user account established with that provider, or when picking up the goods.

As with the embodiment illustrated in FIG. 3A, in the embodiment shown in FIG. 5A the order 372 is not transmitted from the smartphone 310 until the order completion estimate for the order 372 and the arrival estimate for the user at the relevant provider location substantially coincide.

Figure 5B:
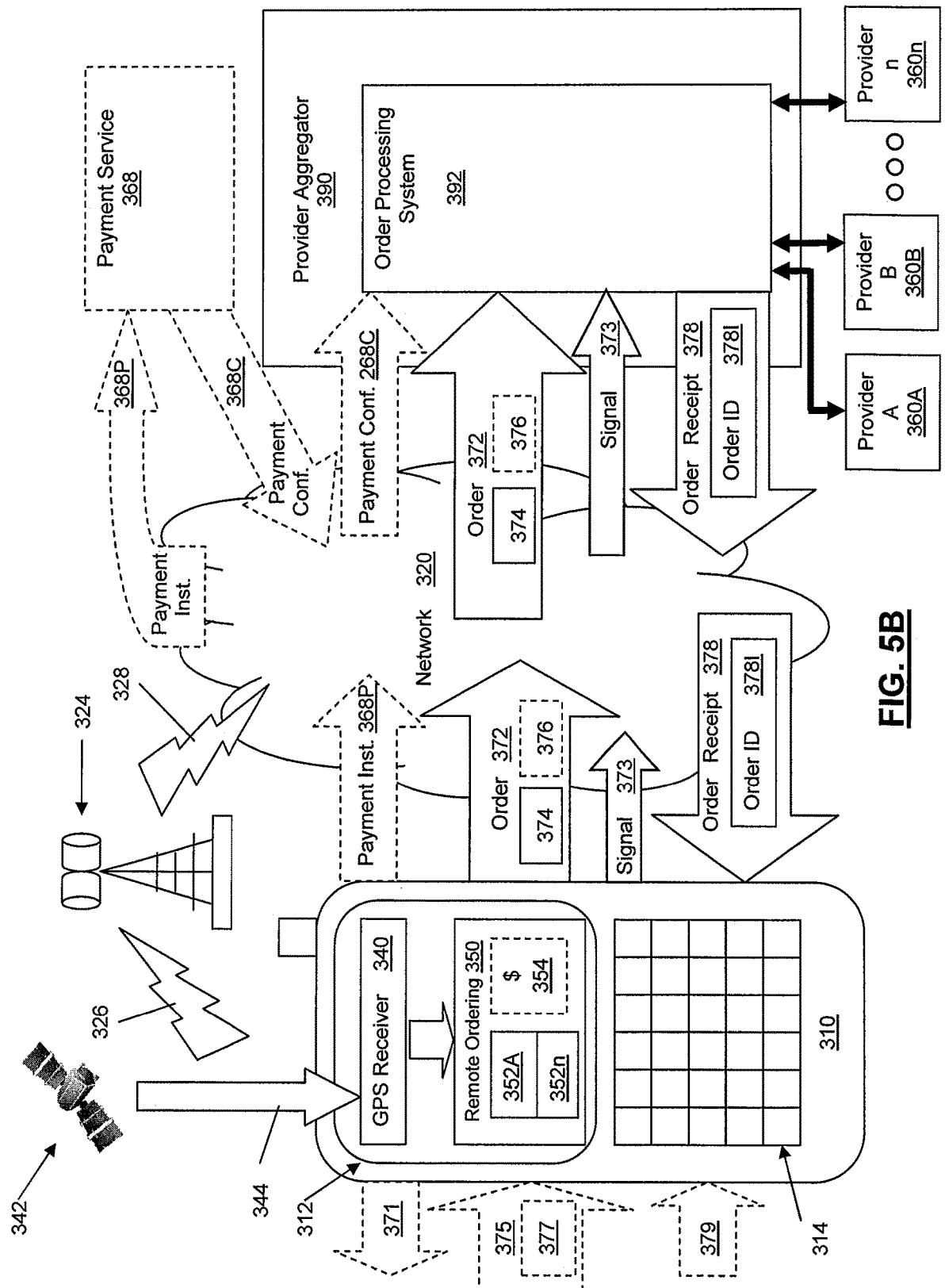
FIG. 5B shows a schematic representation of a second exemplary arrangement for implementing a method for scheduling processing of an order by a provider aggregator.

FIG. 5B shows an alternate embodiment of the arrangement shown in FIG. 5A, which is similar to the arrangement shown in FIG. 3B except that a provider aggregator 390 is interposed between the remote ordering application 350 and a plurality of providers 360A, 360B . . . 360n as shown in FIG. 5A. Thus, in FIG. 5B, the order 372 is transmitted in advance and physical processing and fulfillment of the order 372 is held in abeyance until the smartphone 310 transmits a separate signal 373 to the order processing system 392 of the provider aggregator 390. In FIG. 5B, like reference numerals are used to refer to features corresponding to those in FIGS. 2B and 5A.

Figure 5C:
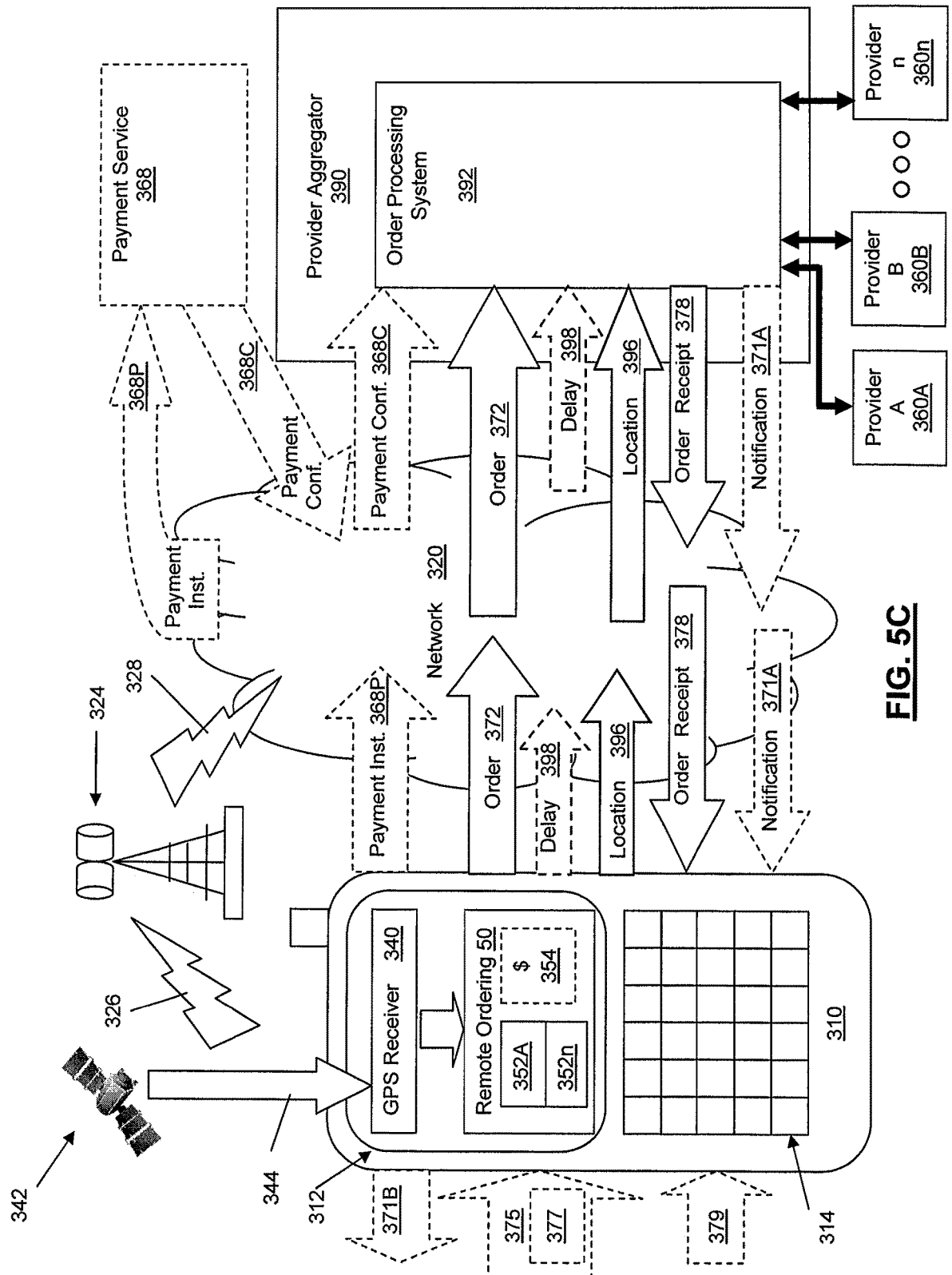
FIG. 5C shows a schematic representation of a third exemplary arrangement for implementing a method for scheduling processing of an order by a provider aggregator.

FIG. 5C shows another alternate embodiment of the arrangement shown in FIG. 5A. FIG. 5C is similar to the arrangement shown in FIG. 3C except that a provider aggregator 390 is interposed between the remote ordering application 350 and a plurality of providers 360A, 360B . . . 360n as shown in FIG. 5A. Thus, in FIG. 5C, the order 372 is transmitted in advance and the smartphone 310 periodically transmits location information 396 to the order processing system 392 of the provider aggregator 390, with physical processing and fulfillment of the order 372 being delayed until the order processing system 392 of the provider aggregator 390 determines that the arrival estimate and the order completion estimate substantially coincide and (if applicable) there is no outstanding delay signal 398. In FIG. 5C, like reference numerals are used to refer to features corresponding to those in FIGS. 3C and 5A.

Figure 5D:
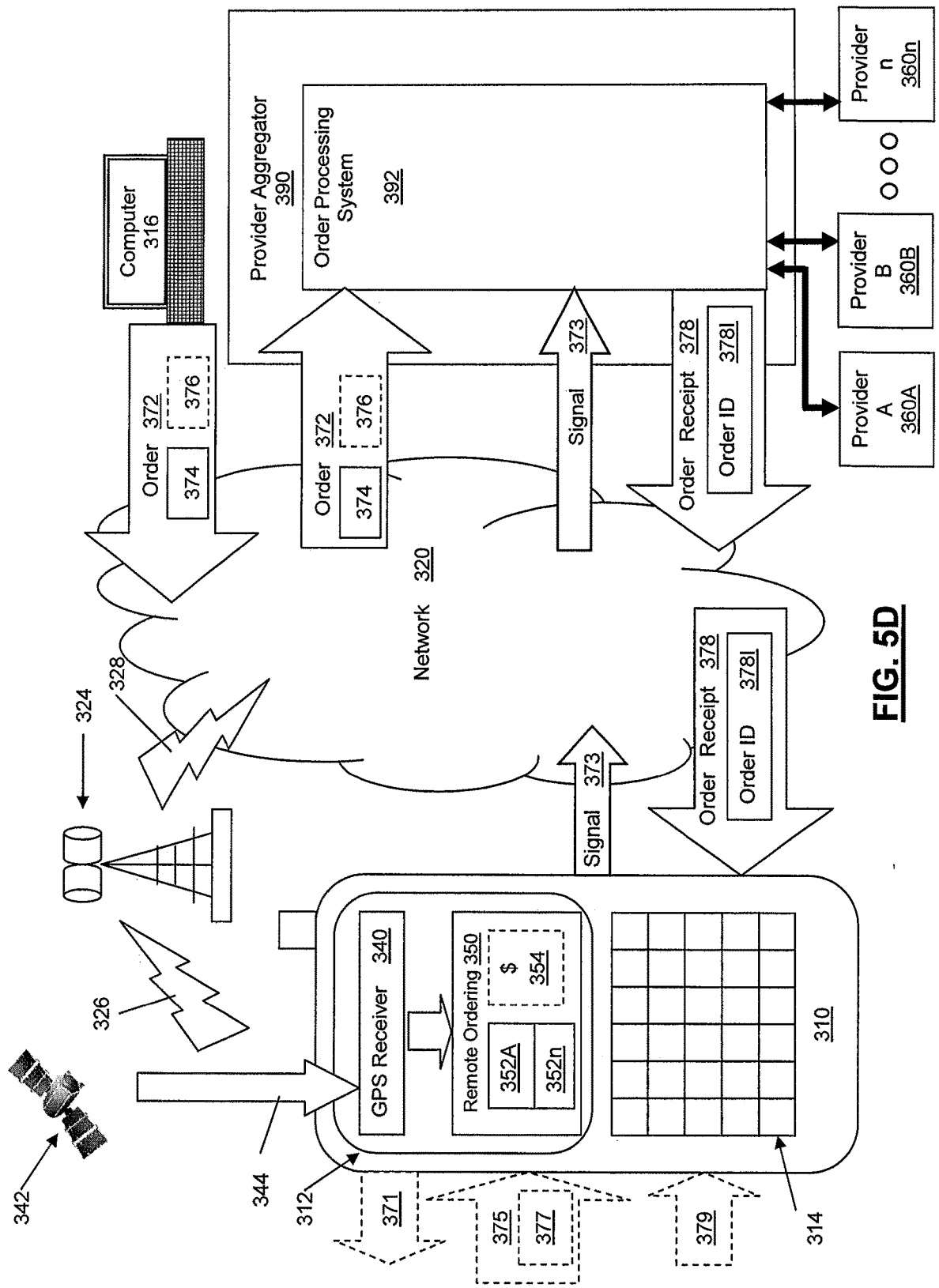
FIG. 5D shows a schematic representation of a fourth exemplary arrangement for implementing a method for scheduling processing of an order by a provider aggregator.
Figure 5E:
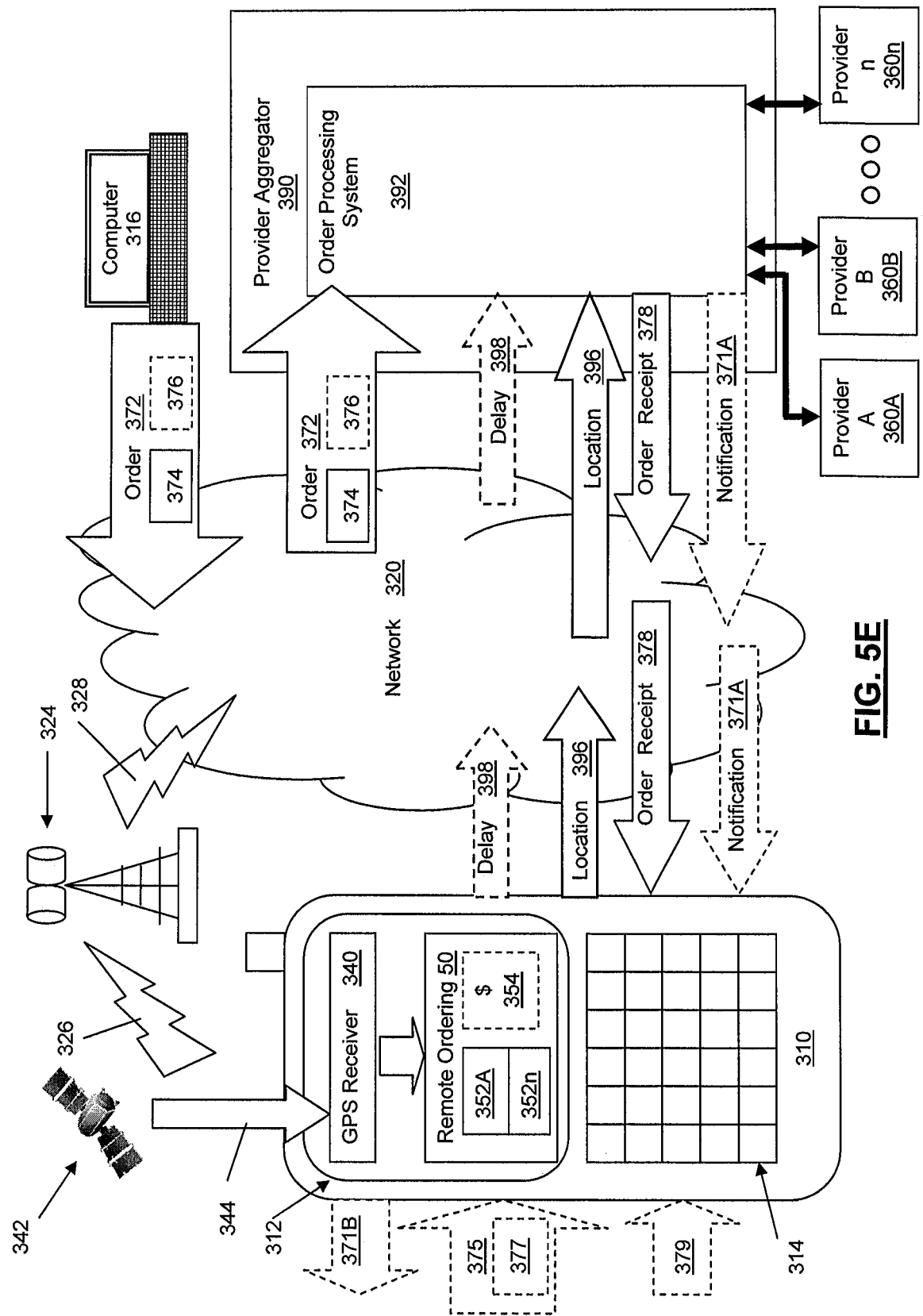
FIG. 5E shows a schematic representation of a fifth exemplary arrangement for implementing a method for scheduling processing of an order by a provider aggregator.

FIGS. 5D and 5E show arrangements similar to those in FIGS. 5B and 5E, respectively, except that the order 372 is sent from a user's desktop computer 316 to the provider 360, in a manner similar to that shown in FIGS. 3D and 3E.

The arrangements shown in FIGS. 5A, 5B and 5C are substantially identical to those shown and described in respect of FIGS. 3A, 3B and 3C, respectively, except that the order 372, the signal 373, if any (FIG. 5B) and the location information 396, if any (FIGS. 5C and 5E) are sent to the order processing system 392 of the provider aggregator 390, which then passes on the order 372 and/or sends an order commencement signal to the relevant provider 360. The order processing system 392 of the provider aggregator 390 may be integrated with a central order processing system of a provider 360, or directly with the point-of-sale order processing systems of the relevant provider locations 366, or the provider locations 366 may be provided with a computer system or terminal linked to the order processing system 392 of the provider aggregator 390 to display incoming orders.

Optionally, where the order 372 was sent ahead of time, instead of automatically transmitting the signal 373 to commence processing based on a detected location, a user may manually trigger the signal 373. For example, a user who has previously submitted an order 372 could manually use his or her smartphone 310 or desktop computer 316 to send the signal 373 just before he or she leaves to pick up the ordered goods. This arrangement would have particular application to situations where rapid spoilage or degradation of the goods being prepared is unlikely to be an issue, such as general merchandise stores, video rental stores, jewelry stores, liquor and beer stores, and grocery stores (depending on the items ordered). Also optionally, a remote ordering application may permit a user to send an indication (not shown) that they are ready to pick up a previously submitted order. In response to such an indication, the order processing system 362, 392 of the provider 360 or provider aggregator 390 could determine and transmit an order completion estimate to the remote ordering application indicating when processing of the order will be complete. The order completion estimate may be based on current demand, staffing and the like at the provider location. The user could then use the remote ordering application to either confirm that he or she will attend at the provider location, or request that the order processing system 362, 392 send a notification either when the order processing is complete or when the location information from the user's networked mobile wireless telecommunication computing device indicates that the user's travel time is approximately equal to the order processing time.

Figure 6:
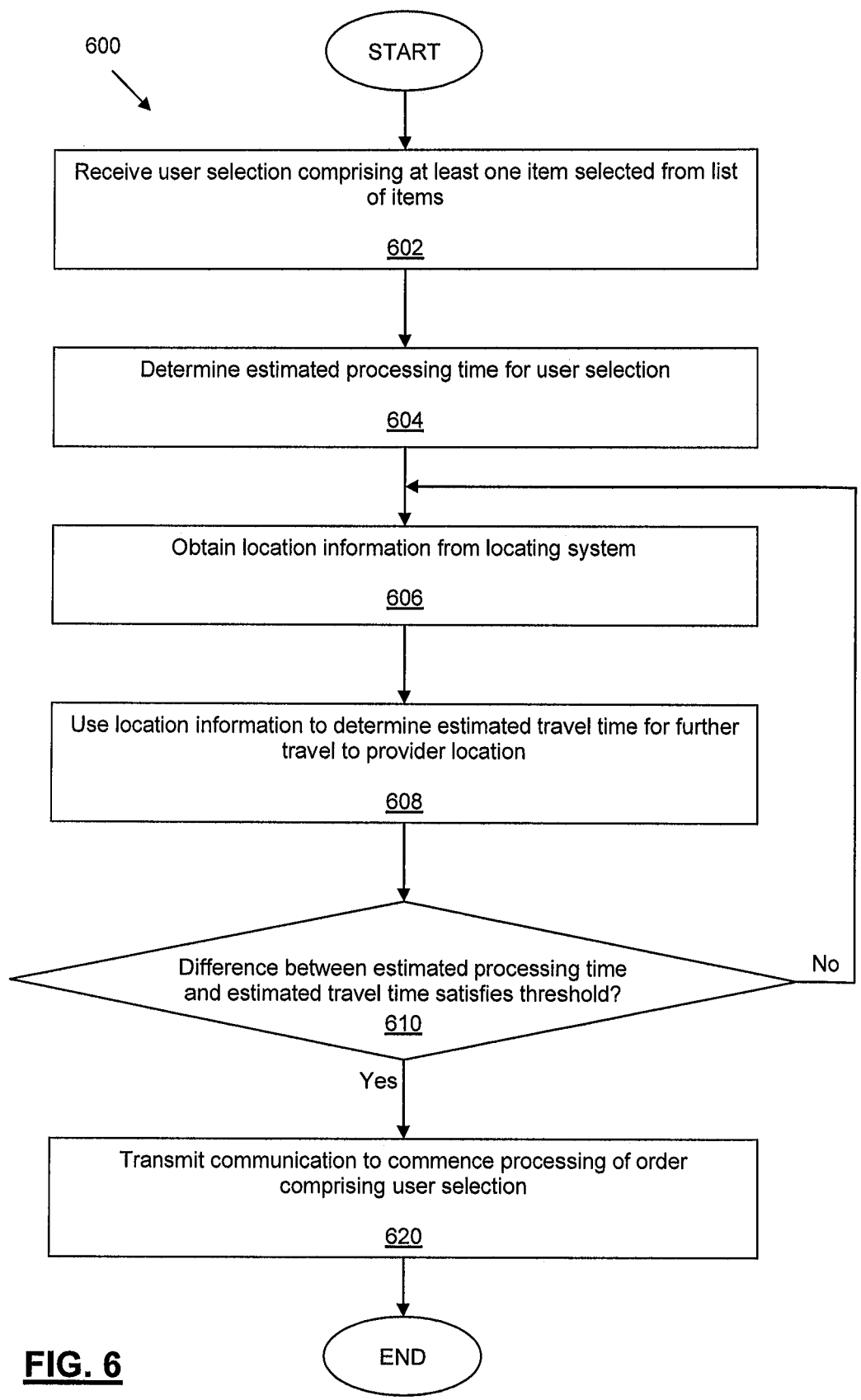
FIG. 6 is a flow chart illustrating a first exemplary implementation of the method of FIG. 2.

Referring now to FIG. 6, a flow chart illustrating a first exemplary implementation of the method 200 of FIG. 2 is indicated generally at 600. The method 600 may be executed by a networked mobile wireless telecommunication computing device, such as the smartphone 10. The method 600 may also be executed by the order processing system of either a provider or a provider aggregator, with the mobile wireless telecommunication computing device simply transmitting the order and then transmitting location information.

At step 602, the method 600 receives a user selection comprising at least one item selected from a list of items; this is a particular embodiment of step 202 of the method 200 shown in FIG. 2. Where the method 600 is executed by the mobile wireless telecommunication computing device, step 602 will comprise receiving the user's selection. Where the method 600 is executed by the order processing system of either a provider or a provider aggregator, step 602 will typically comprise receiving an order from a mobile wireless telecommunication computing device.

At step 604, the method 600 determines an estimated processing time for the user selection; this is a particular embodiment of step 206 of the method 200 shown in FIG. 2. Where the method 600 is executed by a mobile wireless telecommunication computing device, the mobile wireless telecommunication computing device can calculate the estimated processing time itself (for example using the remote ordering application 350), or can send a preliminary indication of the user selection to the order processing system, which can return the estimated processing time to the mobile wireless telecommunication computing device. Where the method 600 is executed by the order processing system of either a provider or a provider aggregator, step 604 may comprise estimating the processing time for the order or using a pre-determined fixed estimate. Physical processing and fulfillment would not yet commence.

At step 606, the method 600 obtains location information from a locating system for the mobile wireless telecommunication computing device. Where the method 600 is executed by a mobile wireless telecommunication computing device, step 606 involves communication between the remote ordering application 350 and the locating system for the mobile wireless telecommunication computing device, such as the GPS receiver 340 in the case of the smartphone 310, possibly with the cooperation of a navigation application. Where the method 600 is executed by the order processing system of either a provider or a provider aggregator, the location information will typically be sent by the mobile wireless telecommunication computing device to the order processing system. The location information may comprise an identification of the user's location, which is associated with the order for goods, and may be obtained by the order processing system querying the mobile wireless telecommunication computing and receiving the identification of the initial location from the mobile wireless telecommunication computing device in response to the query.

At step 608, the method 600 uses the location information to determine the estimated travel time for further travel to the selected provider location of the provider associated with the list of items from which the selection was received. The algorithm may incorporate information about a planned travel route to enhance the accuracy of the estimated travel time. Various algorithms for determining estimated travel time are known in the field of GPS navigation and hence are within the capability of one skilled in the art, now informed by the herein disclosure.

Steps 606 and 608 together comprise a particular embodiment of step 204 of the method 200 shown in FIG. 2. Where the method 600 is executed by a an order processing system of a provider or provider aggregator, the order processing system can execute steps 606 and 608 either by querying the mobile wireless telecommunication device, receiving an identification of the user's location from the mobile wireless telecommunication device (step 606) and using that location information to execute its own calculation of the estimated travel time (step 608) or by causing the mobile wireless telecommunication device to obtain an identification of the user's location (step 606) and then using that location information to determine an estimated travel time and send it to the order processing system (step 608). Thus, an order processing system of a provider or provider aggregator may execute steps 606 and 608 by querying the user's mobile wireless telecommunication computing device and receiving the estimated travel time from the mobile wireless telecommunication computing device in response to the query, both for the initial estimated travel time and for updated estimated travel times.

At step 610, the method 600 compares the estimated processing time to the estimated travel time, and determines whether the difference between the estimated processing time and the estimated travel time satisfies a threshold, generally indicating that the estimated processing time and the estimated travel time are at least approximately equal. Step 610 is a particular implementation of step 208 of the method 200 shown in FIG. 2. The threshold used at step 610 is selected based on the exigencies of the particular circumstances, and may be set so that the threshold is satisfied when the estimated processing time is slightly greater than the estimated travel time, slightly less than the estimated travel time, or equal to the estimated travel time. Preferably, the threshold is deemed to be satisfied in any case in which the estimated processing time is greater than the estimated travel time, since this would indicate that the user is likely to arrive at the provider location before processing of the order is complete, so processing of the order should begin immediately to minimize waiting by the user.

If the method 600 determines that the difference between the estimated processing time and the estimated travel time does not satisfy the threshold (a "no" at step 610), the method 600 returns to step 606 to obtain updated location information. The return from step 610 to step 606 to obtain new location information, and then using the new location information to determine a new estimated travel time at step 608, is a particular embodiment of step 210B of the method 200 shown in FIG. 2. It will be noted that the exemplary method 600 does not implement step 210A of the method 200 shown in FIG. 2; i.e. the method 600 does not update the estimated processing time for the user selection. In an alternate embodiment of the method 600 in which the estimated processing time were also to be updated, following a "no" determination at step 610 the method 600 would return to step 604 to update the estimated processing time, and then proceed to step 606, instead of returning directly from step 610 to step 606.

If the method 600 determines that the difference between the estimated processing time and the estimated travel time satisfies the threshold (a "yes" at step 610), the method 600 proceeds to step 620. At step 620, in response to the determination at step 610 that the difference between the estimated processing time and the estimated travel time satisfies the threshold, the method 600 transmits a communication to commence processing of an order comprising the user selection. Where the method 600 is executed by a mobile wireless telecommunication computing device such as the smartphone 310, step 620 may comprise transmitting the order 372, including the payment information 354, to the order processing system 362, 392 of the provider 360 or provider aggregator 390, in which case the signal to commence processing is embodied in the order 372. Alternatively, where order 372 was sent in advance, the signal to commence processing would be a signal 373 separate from but associated with the order 372. Where the method 600 is executed by the order processing system of a provider aggregator, the signal to commence processing of the order would be sent to the order processing system of the relevant provider, or possibly directly to the relevant provider location, and where the method 600 is executed by the provider, the signal would be sent to the relevant provider location, or where the provider comprises a single location, may be a signal to alert the staff to begin processing the order. The signal may comprise the order 372 itself or, if the order 372 was sent by the relevant processing system in advance, a signal separate from but associated with the order 372 may be sent. Step 620 corresponds to step 220 of the method 200 shown in FIG. 2.

Figure 6A:
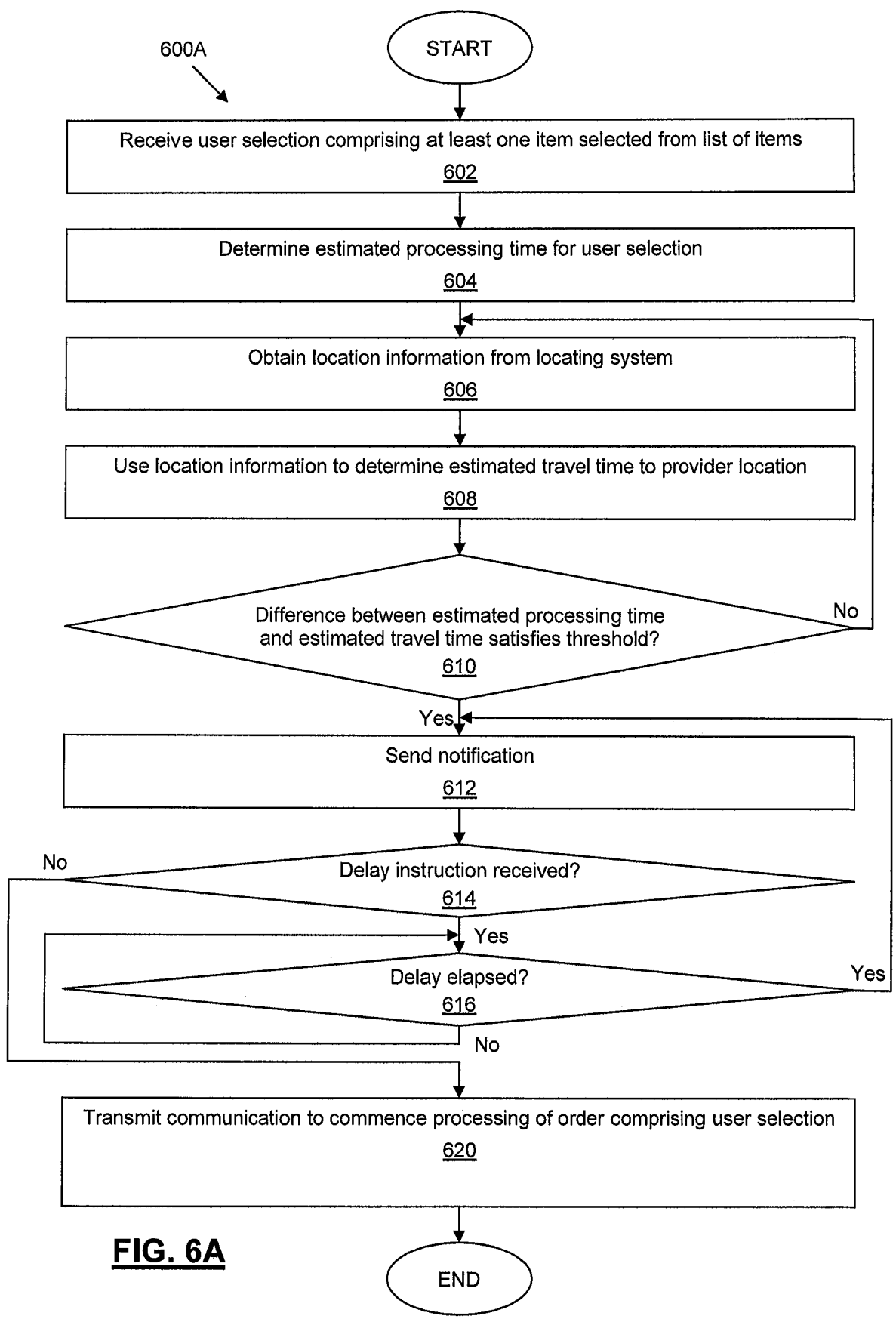
FIG. 6A is a flow chart illustrating a first exemplary implementation of the method of FIG. 2A.

FIG. 6A is a flow chart illustrating a first exemplary implementation 600A of the method 200A shown in FIG. 2A. The method 600A shown in FIG. 6A is similar to the method 600 shown in FIG. 6, with like reference numerals used to refer to corresponding steps, except that the method 600A shown in FIG. 6A provides a notification that the communication to commence processing (step 620) is about to be sent, and accommodates a delay instruction.

Continuing to refer to FIG. 6A, in response to the determination at step 610 that the difference between the estimated processing time and the estimated travel time satisfies the threshold, at step 612 the method 600A sends a notification to the user that the communication to commence processing (step 620) is about to be sent. Step 612 of the method 600A corresponds to step 212 of the method 200A shown in FIG. 2A. At step 614, which corresponds to step 214 of the method 200A shown in FIG. 2A, the method 600A checks whether a delay instruction has been received. Typically, step 614 will occur after a suitable pause following step 612, to provide the user with time to input a delay instruction. If the method 600A determines at step 614 that no delay instruction has been received, the method 600A proceeds to step 620 to send the communication to begin processing. Step 620 of the method 600A corresponds to step 220 of the method 200A shown in FIG. 2A. If the method 600A determines at step 614 that a delay instruction has been received, then at step 616, which corresponds to step 216 of the method 200A shown in FIG. 2A, the method 600A checks whether the delay period has elapsed, and if it has not elapsed, continues to monitor for whether the delay has elapsed. Once the method 600A determines at step 616 that the delay period has elapsed, the method 600A returns to step 612 to provide a further notification to the user and an opportunity to the user to enter a new delay instruction. The method 600A shown in FIG. 6A is an implementation of the method 200A shown in FIG. 2A that does not permit a user to cancel a previously input delay instruction; hence the method 600A does not include a step corresponding to step 218 of the method 200A shown in FIG. 2A.

Figure 6B:
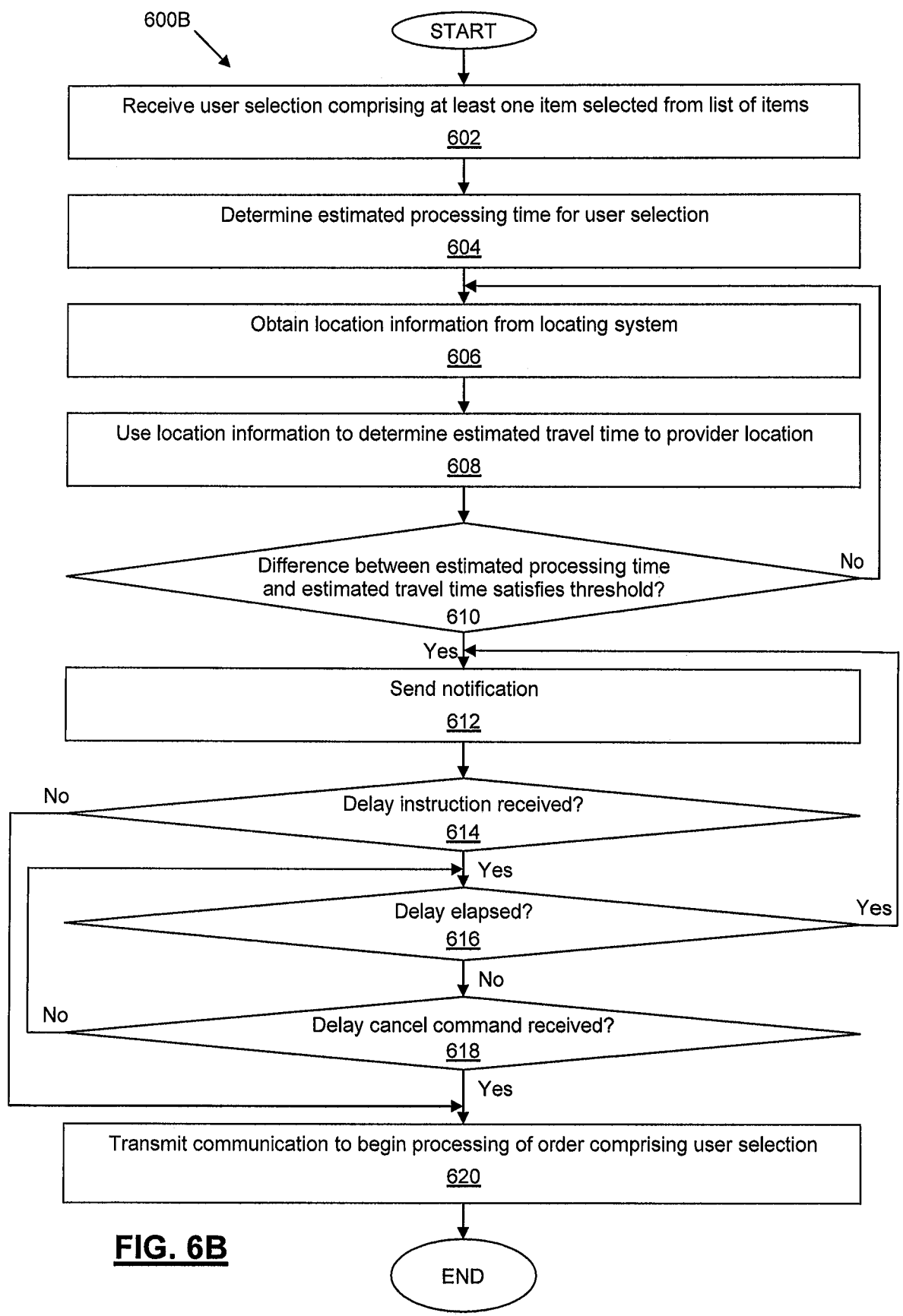
FIG. 6B is a flow chart illustrating a second exemplary implementation of the method of FIG. 2A.

FIG. 6B is a flow chart illustrating a second exemplary implementation 600B of the method 200A shown in FIG. 2A. The method 600B shown in FIG. 6B is identical to the method 600A shown in FIG. 6A, except that it allows a user to provide a delay cancel command to cancel a previous delay instruction. Again, like reference numerals are used to refer to corresponding steps. In the method 600B, after a determination (step 616) that the delay period has not elapsed, the method 600B checks at step 618 whether a delay cancel command has been received and then returns to step 616 if no delay cancel command was received. Step 618 of the method 600B corresponds to step 218 of the method 200A shown in FIG. 2A.

Figure 7:
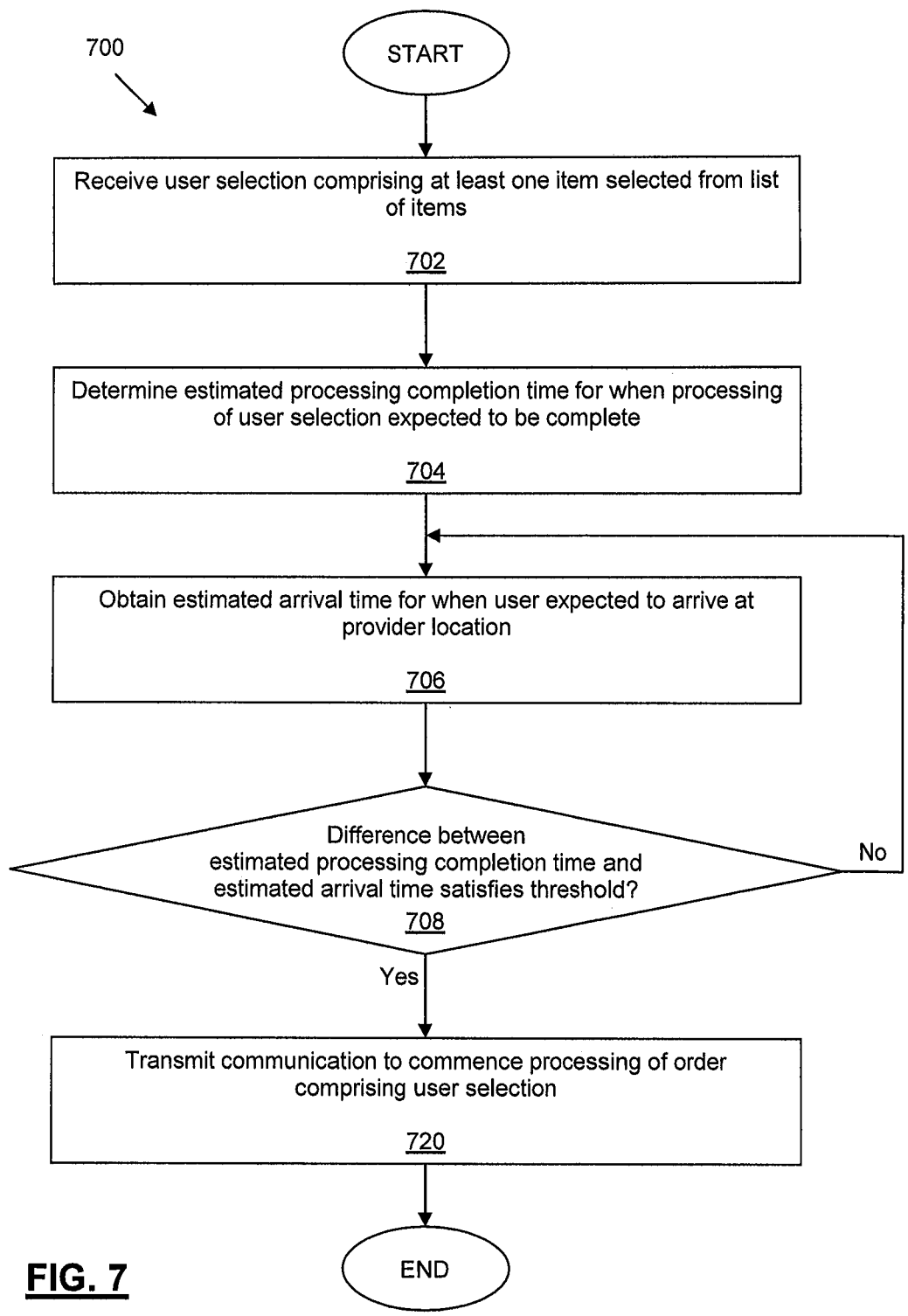
FIG. 7 is a flow chart illustrating a second exemplary implementation of the method of FIG. 2.

Reference is now made to FIG. 7, which shows a flow chart illustrating a second exemplary implementation 700 of the method 200 of FIG. 2. While the methods 600, 600A and 600B shown in FIGS. 6, 6A and 6B, respectively, determine whether the arrival estimate and the order completion estimate substantially coincide by comparing an estimated processing time for the order to the user's estimated travel time to the relevant provider location, the method 700 shown in FIG. 7 compares an estimated arrival time for the user to an estimated processing completion time for the order (i.e. the user's selection). The method 700 is otherwise similar to the method 600 shown in FIG. 6, and may be executed by a user's mobile wireless telecommunication computing device or by the order processing system of either a provider or a provider aggregator, and may be provided as a computer program product.

At step 702, which is a particular embodiment of step 202 of the method 200 shown in FIG. 2, the method 700 receives a user selection comprising at least one item selected from a list of items. In cases where a user's mobile wireless telecommunication computing device executes the method 700, step 602 will comprise receiving the user's selection, whereas for an order processing system of a provider or a provider aggregator, step 602 will typically comprise receiving an order from a mobile wireless telecommunication computing device.

At step 704, in a particular embodiment of step 206 of the method 200 shown in FIG. 2, the method 700 determines an estimated processing completion time (i.e. time of day) for the user selection. A mobile wireless telecommunication computing device executing the method 700 can calculate the estimated processing time itself or receive it from the order processing system. An order processing system of a provider or a provider aggregator can execute step 704 by estimating the processing time for the order or using a pre-determined fixed estimate. In either case, physical processing and fulfillment of the order comprising the user selection would not yet commence.

At step 706, which is a particular embodiment of step 204 of the method 200 shown in FIG. 2, the method 700 obtains an estimated arrival time for when a user is expected to arrive at the provider location where the user selection is to be processed.

An order processing system of a provider or provider aggregator executing the method 700 can execute step 706 either by querying the user's mobile wireless telecommunication device to obtain an identification of the user's location and using that location information to execute its own calculation of the estimated arrival time, by causing the user's mobile wireless telecommunication device to determine an estimated arrival time and send it to the order processing system, or by causing the user's mobile wireless telecommunication device to determine and send to the order processing system an estimated travel time, which the order processing system can add to the current time to obtain the estimated arrival time.

At step 708, which is a particular implementation of step 208 of the method 200 shown in FIG. 2, the method 700 compares the estimated completion processing time to the estimated arrival time, and determines whether the difference between the estimated processing time and the estimated travel time satisfies a suitable threshold. A "yes" result at step 708 generally indicates that the estimated processing completion time and the estimated arrival time, both represented as a time of day, are close to one another. In addition, it is preferable that the threshold is set so that step 708 will produce a "yes" result in cases where the estimated processing completion time is later than the estimated arrival time, as this result suggests that processing of the order will not be completed until after the user arrives at the provider location. In such circumstances, processing of the order should begin immediately so that waiting by the user after he or she arrives is minimized.

In response to a "yes" at step 706, the method 700 proceeds to step 720, at which the method 700 transmits a communication to commence processing of an order comprising the user selection. Step 720 corresponds to step 220 of the method 200 shown in FIG. 2. Where a mobile wireless telecommunication computing device executes the method 700, step 720 may comprise transmitting the order 372, including the payment information 354, to the order processing system 362, 392 of the provider 360 or provider aggregator 390 or, where the order 372 was sent in advance, the signal to commence processing would be a separate signal 373 associated with the order 372. In cases where the order processing system of a provider aggregator executes the method 700, the signal to commence processing of the order would be sent to the order processing system of the relevant provider or to the relevant provider location. Where the method 700 is executed by the order processing system of a provider, the signal would be sent to the relevant provider location, or where the provider comprises a single location, could be a signal to alert the staff to begin processing the order. The signal may comprise the order 372 itself or, if the order 372 was sent by the relevant data processing system in advance, a signal separate from but associated with the order 372 may be sent.

In response to a "no" determination at step 708, indicating that the difference between the estimated processing completion time and the estimated arrival time does not satisfy the threshold, the method 700 returns to step 706 to obtain an updated estimated arrival time; the return from step 708 to step 706 is a particular embodiment of step 210B of the method 200 shown in FIG. 2. Optionally, if the estimated processing completion time were also to be updated, step 210A of the method 200 shown in FIG. 2 could be implemented by returning to step 704 rather than step 706 following a "no" determination at step 708, and then proceeding to step 706.

Figure 7A:
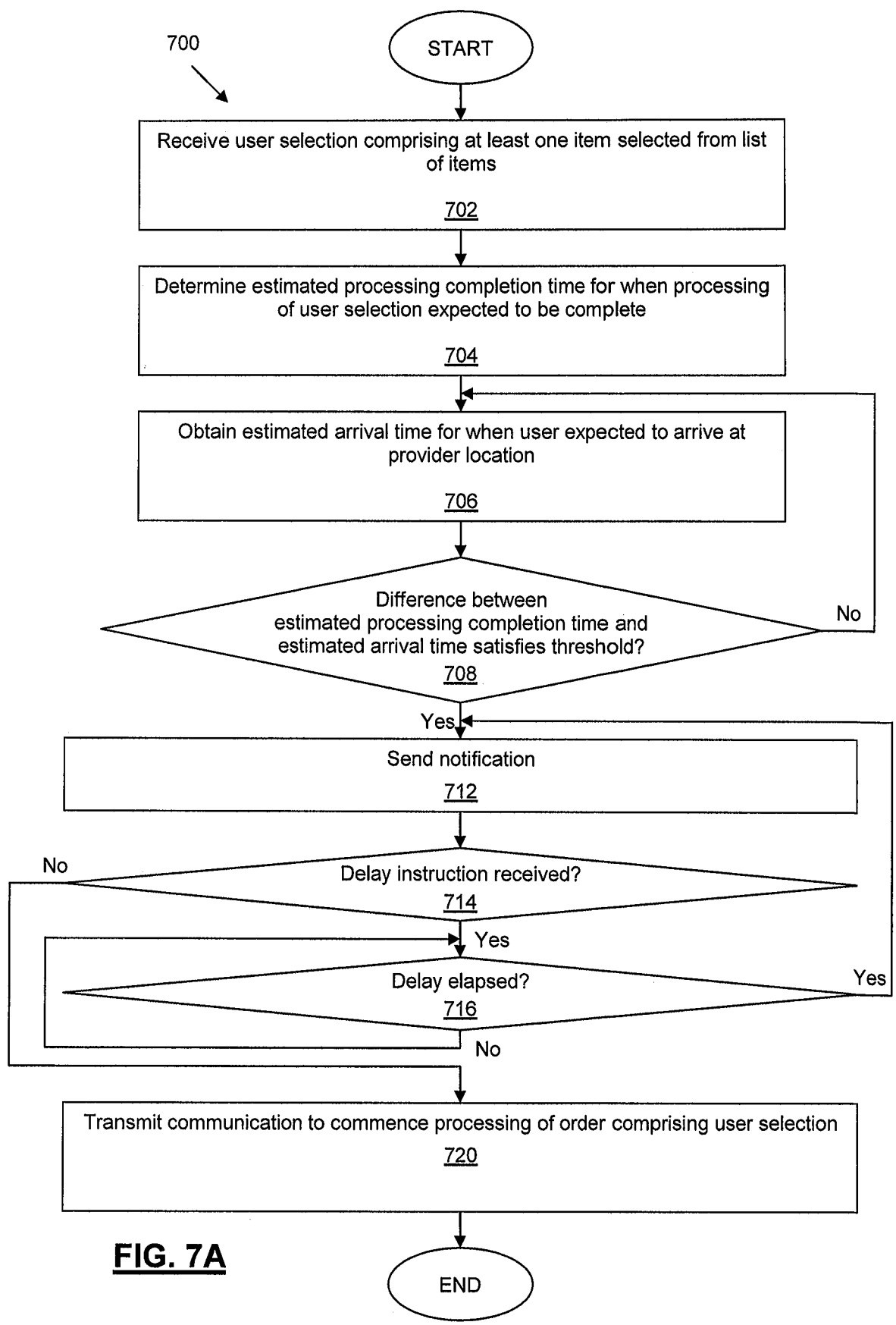
FIG. 7A is a flow chart illustrating a third exemplary implementation of the method of FIG. 2A.

FIG. 7A is a flow chart illustrating a third exemplary implementation 700A of the method 200A shown in FIG. 2A. The method 700A shown in FIG. 7A is similar to the method 700 shown in FIG. 7, with identical steps being denoted by identical reference numerals. Like the method 600A in FIG. 6A, the method 700A in FIG. 7A provides a notification that the communication to commence processing is about to be sent and accommodates a delay instruction. Steps 712, 714 and 716 of the method 700A in FIG. 7A correspond to steps 612, 614 and 616 of the method 600A shown in FIG. 6.

FIG. 7B is a flow chart showing a fourth exemplary implementation 700B of the method 200A shown in FIG. 2A. The method 700B in FIG. 7B is identical to the method 700A shown in FIG. 7A, except that it allows a user to provide a delay cancel command to cancel a previous delay instruction. Again, like reference numerals are used to refer to corresponding steps, and step 718 of the method 700B in FIG. 7B corresponds to step 618 of the method 600B shown in FIG. 6B.

A user may allow him or herself to be openly solicited based on location information or based on a category of interest, or both. For example, a user may be hungry but not sure where he or she would like to eat, or may be in an unfamiliar area and unsure of what restaurant options are available. The user could open an application, such as the remote ordering application 350, on his or her networked mobile wireless telecommunication computing device, such as the smartphone 310, and choose to be solicited. Individual restaurants associated with a provider aggregator 390 may have submitted commercial data to the provider aggregator 390 in advance, such as daily specials, or may determine that a user is requesting such a commercial solicitation, for example by way of a request from an order processing system 392 of the provider aggregator 390, and submit the relevant commercial data in response. The provider aggregator 390 then generates the commercial solicitations based on the location information and/or the area of interest, and transmits them to the remote ordering application 350 on the user's networked mobile wireless telecommunication computing device. The user can then choose the most appealing commercial solicitation, and place an order using the remote ordering application 350 as described above. The provider aggregator 390 can also provide directions to the selected provider, or interface with a navigation system on the user's networked mobile wireless telecommunication computing device to provide such directions.

In certain embodiments, a general search for commercial solicitations can be provided, without reference to the user's current or planned location, for cases where a user may wish to be made aware of the various commercial solicitations, such as daily specials, within a wider geographic area. For example, a user may be at home and be hungry but not sure where to eat, and can determine what daily specials are available from restaurants associated with the provider aggregator 390, or may be interested in acquiring a particular product such as a television, and can specify "electronics" as an area of interest to see if there are any relevant special offers among the providers 360A, 360B . . . 360n associated with the provider aggregator 390. In such cases, the user may not wish to set geographical limitations in advance, because he or she may be willing to travel further depending on how enticing the offer is.

Figure 8:
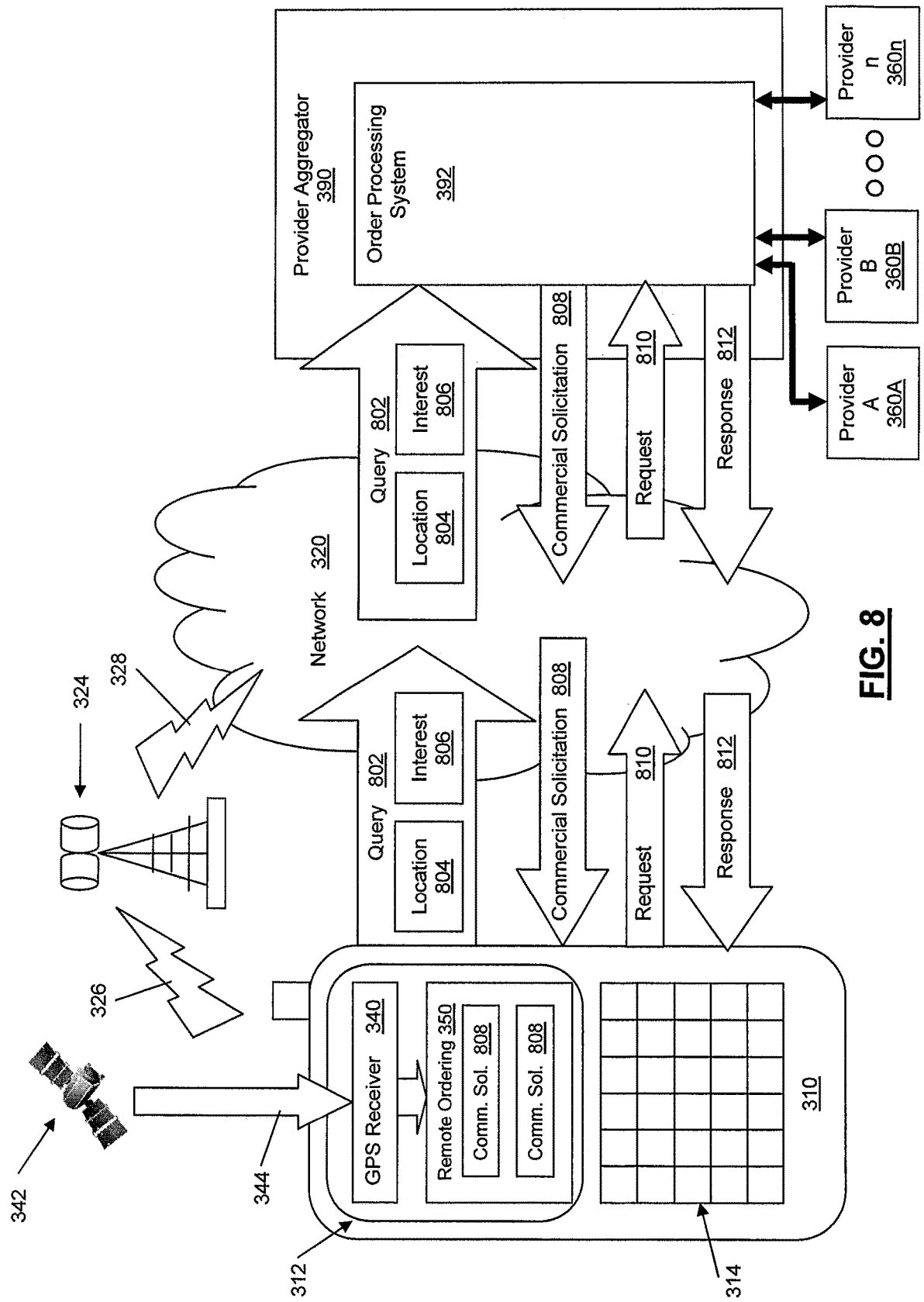
FIG. 8 illustrates schematically an arrangement and method for communicating at least one commercial solicitation.

Reference is now made to FIG. 8, which illustrates schematically an arrangement and method for communicating at least one commercial solicitation. The physical components of the arrangement are identical to those shown in FIGS. 5A to 5C, and hence corresponding reference numerals are used to refer to corresponding features.

A user of the smartphone 310 generates a query 802 using the remote ordering application 350, and the smartphone 310 then transmits the query 802 through the network 320 to the order processing system 392 of a provider aggregator 390. The query 802 includes location information 804 and a specification 806 indicating an area of interest to the user. The location information 804 may be the current location of the smartphone 310 (and hence the user) derived from the GPS receiver 340, or may be manually entered by the user. For example, if the user is travelling, the user may wish to specify his or her destination rather than his or her present location. In another embodiment, the query may be sent from a user's desktop computer instead of from a networked mobile wireless telecommunication device, in which case the location information may be manually entered or obtained from an ISP. Optionally, the location information 804 may comprise a planned travel route, so that providers 360A, 360B . . . 360n along the planned travel route can be identified. This would enable, for example, a user who is about to head home from work and wants to pick up food to receive commercial solicitations from providers located along his or her planned route, and then place an order in accordance with the methods described above.

The specification 806 indicating an area of interest to the user is optional, and is used in cases where the provider aggregator 390 coordinates the offerings of providers 360A, 360B . . . 360n in different areas of interest. For example, if the provider aggregator 390 aggregates restaurants, the specification 806 could specify different types of restaurant, and if the provider aggregator 390 is the management of a shopping mall, it may coordinate providers 360A, 360B . . . 360n in such diverse areas of interest as restaurants, electronics, furniture, jewellery, hairstyling, general merchandise, clothing (including both men's and women's clothing and various subcategories of clothing such as formal wear, casual wear, urban wear, swim wear and the like), pet stores, and so on. By providing for the specification 806 indicating an area of interest to the user, the provider aggregator 390 can provide a more useful response to the query 802.

The order processing system 392 of the provider aggregator 390 receives the query 802, including the location information 804 and specification 806 of an area of interest, if any, and in response, determines at least one local provider 360A, 360B . . . 360n having a provider location within a predetermined proximity to the location specified by the location information 804. The order processing system 392 selects only local providers 360A, 360B . . . 360n whose offerings correspond with the area of interest indicated by the specification 806. The determination and selection can be made in any order. For example, the providers 360A, 360B . . . 360n corresponding to the area of interest can be selected first, and then those providers having a provider location within a predetermined proximity to the location specified by the location information 804 can be determined from that subset. Alternatively, the order processing system 392 may first determine those providers having a provider location within a predetermined proximity to the location specified by the location information 804, and then select the providers 360A, 360B . . . 360n corresponding to the area of interest. Once the order processing system 392 has identified the local providers 360A, 360B . . . 360n having a provider location within a predetermined proximity to the location specified by the location information 804, and also corresponding to the area of interest, if applicable, the order processing system 392 will transmit at least one commercial solicitation 808 associated with a respective one of the at least one local provider 360A, 360B . . . 360n to the smartphone 310 via the network 320.

In one alternative embodiment, such as where the provider aggregator 390 coordinates the offerings of providers 360A, 360B . . . 360n in only a single area of interest, the specification 806 indicating an area of interest, and the provision therefor, may be omitted and determination of providers may be based on the location information 804, without reference to area of interest. In another alternative embodiment, the location information 804 may be omitted and the providers may be selected based on area of interest, without reference to location. This latter embodiment would be suitable for cases where the provider aggregator 390 is the management of a shopping mall. Thus, a user who is planning to head to the mall to purchase jeans, for example, could select "jeans", either from a list or by entering "jeans" as a key word, and receive commercial solicitations from jean stores within the shopping mall. The user may also be provided with directions for navigation within the mall to a selected one of the jean stores.

The query 802 may also include additional criteria for identifying providers, such as hours of operation, price ranges, and other suitable factors.

The commercial solicitations 808 may be in the form of advertisements, special offers, and the like, and may be stored by the order processing system 392 and updated periodically, or alternatively, may be dynamically generated by the order processing system 392 by requesting commercial data from the local providers 360A, 360B . . . 360n identified in response to the query, and then using that commercial data to generate the commercial solicitation(s) 808.

The commercial solicitations 808 may be presented to the user via the remote ordering application 350 which, as noted above, may be a separate application program installed on the smartphone 310 or may be a page or pages within a web browser application on the smartphone 310 or on a desktop computer. The user can then select one of the commercial solicitations 808, and send a request 810 to the order processing system 392 indicating the selection, and the order processing system 392 will then send a response 812 to the request. In one embodiment, the response 812 may comprise directions to the relevant provider location corresponding to the selection indicated by the request 810. In another embodiment, the response 812 may comprise an item list for the relevant provider (or provider location), such as item list 354, comprising a list of available items and corresponding processing times for each item in the list, so that the ordering methods described above may be implemented.

Aspects of the arrangement and method described in respect of FIG. 8 can be suitably adapted for use with a single provider, rather than provider aggregator 390.

Any suitable networked mobile wireless telecommunication computing device, such as a smartphone, tablet computer, laptop computer or the like may be used in accordance with the systems, methods and computer program products disclosed herein. The locating system for the networked mobile wireless telecommunication computing device may be a GPS-based locating system, or where appropriate may be a Wi-Fi locating system or other suitable locating system.

Figure 9:
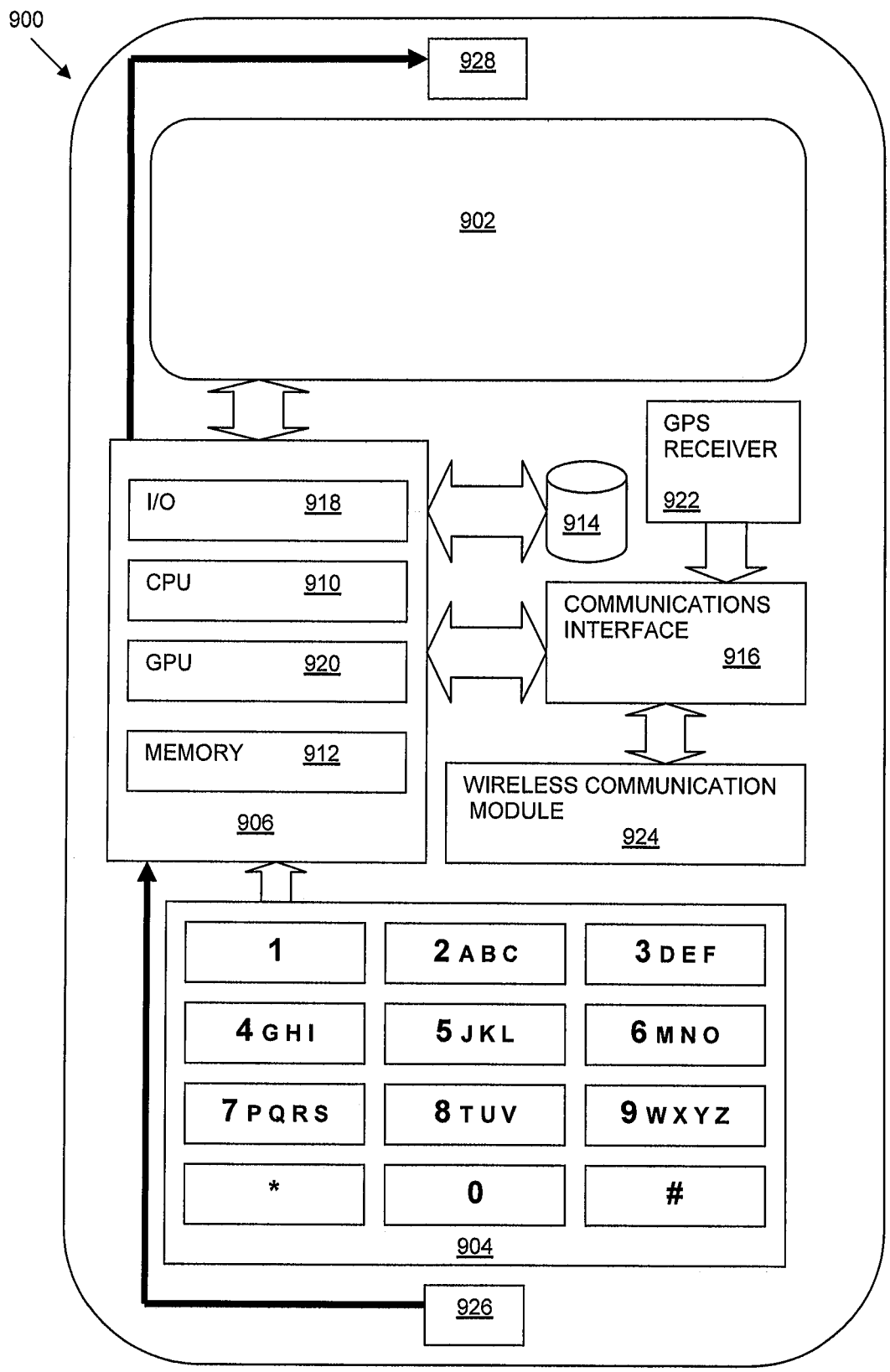
FIG. 9 is a schematic representation of an exemplary smartphone, which may be used in implementing various methods described herein.

FIG. 9 shows an exemplary networked mobile wireless telecommunication computing device in the form of a smartphone 900. The smartphone 900 includes a display 902, an input device in the form of keyboard 904 and an onboard computer system 906. The display 902 may be a touchscreen display and thereby serve as an additional input device, or as an alternative to the keyboard 904. The onboard computer system 906 comprises a central processing unit (CPU) 910 having one or more processors or microprocessors for performing arithmetic calculations and control functions to execute software stored in an internal memory 912, preferably random access memory (RAM) and/or read only memory (ROM) is coupled to additional memory 914 which will typically comprise flash memory, which may be integrated into the smartphone 900 or may comprise a removable flash card, or both. The smartphone 900 also includes a communications interface 916 which allows software and data to be transferred between the smartphone 900 and external systems and networks. The communications interface 916 is coupled to one or more wireless communication modules 924, which will typically comprise a wireless radio for connecting to one or more of a cellular network, a wireless digital network or a Wi-Fi network. The communications interface 916 will also typically enable a wired connection of the smartphone 900 to an external computer system. A microphone 926 and speaker 928 are coupled to the onboard computer system 906 to support the telephone functions managed by the onboard computer system 906, and GPS receiver hardware 922 is also coupled to the communications interface 916 to support navigation operations by the onboard computer system 906. Input and output to and from the onboard computer system 906 is administered by the input/output (I/O) interface 918, which administers control of the display 902, keyboard 904, microphone 926 and speaker 928. The onboard computer system 906 may also include a separate graphical processing unit (GPU) 920. The various components are coupled to one another either directly or by coupling to suitable buses.

Figure 10:
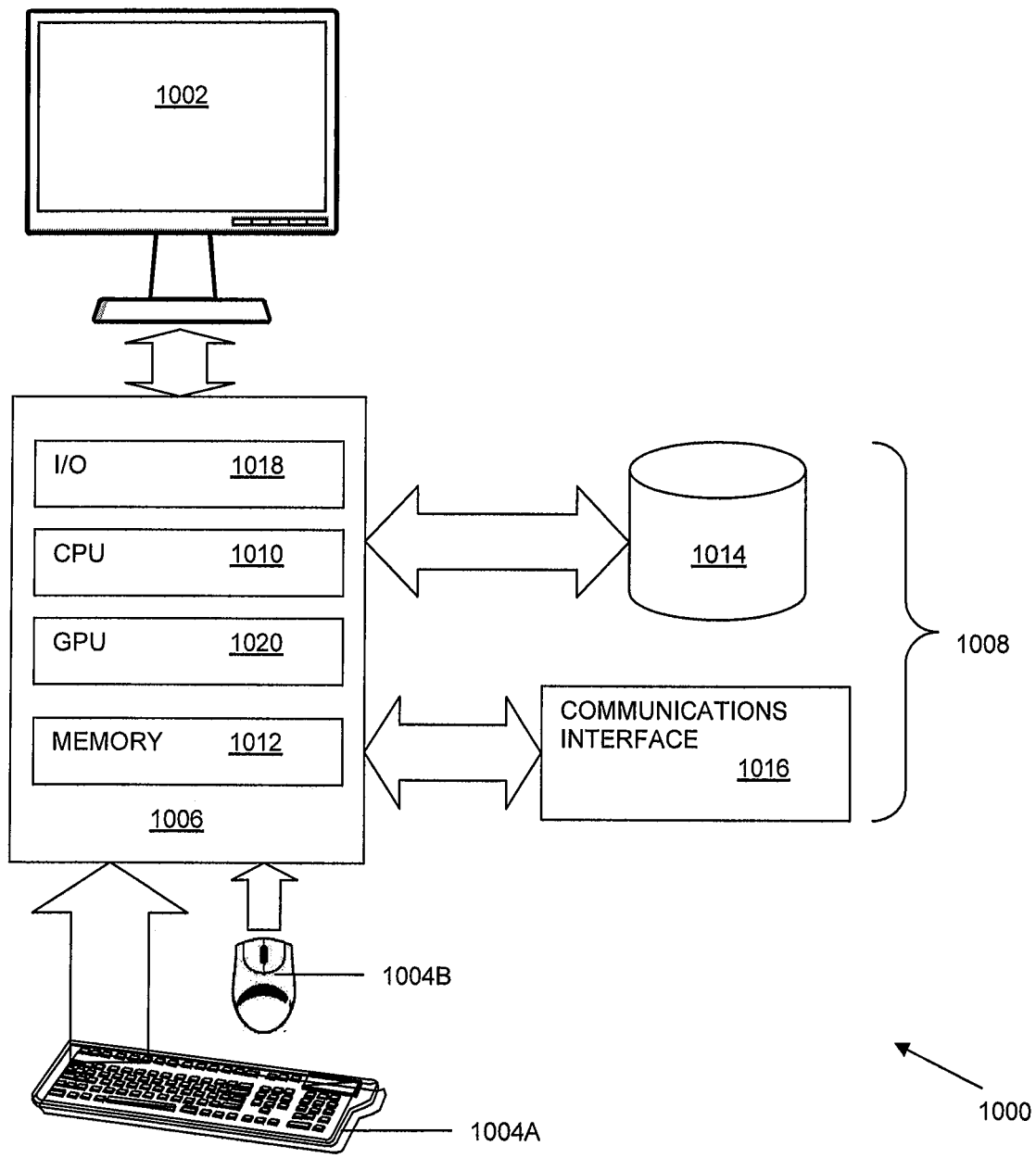
FIG. 10 is a schematic representation of an exemplary computer system, which may be used in implementing various methods described herein.

The methods described herein may be implemented on any suitable computer or microprocessor-based system. An illustrative computer system in respect of which the methods herein described may be implemented is presented as a block diagram in FIG. 10. The illustrative computer system is denoted generally by reference numeral 1000 and includes a display 1002, input devices in the form of keyboard 1004A and pointing device 1004B, computer 1006 and external devices 1008. While pointing device 1004B is depicted as a mouse, it will be appreciated that other types of pointing device may also be used.

The computer 1006 may contain one or more processors or microprocessors, such as a central processing unit (CPU) 1010. The CPU 1010 performs arithmetic calculations and control functions to execute software stored in an internal memory 1012, preferably random access memory (RAM) and/or read only memory (ROM), and possibly additional memory 1014. The additional memory 1014 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 1014 may be physically internal to the computer 1006, or external as shown in FIG. 20.

The computer system 1000 may also include other similar means for allowing computer programs or other instructions to be loaded. Such means can include, for example, a communications interface 1016 which allows software and data to be transferred between the computer system 1000 and external systems and networks. Examples of communications interface 1016 can include a modem, a network interface such as an Ethernet card, a wireless communication interface, or a serial or parallel communications port. Software and data transferred via communications interface 1016 are in the form of signals which can be electronic, acoustic, electromagnetic, optical or other signals capable of being received by communications interface 1016. Multiple interfaces, of course, can be provided on a single computer system 1000.

Input and output to and from the computer 1006 is administered by the input/output (I/O) interface 1018. This I/O interface 1018 administers control of the display 1002, keyboard 1004A, external devices 1008 and other such components of the computer system 1000. The computer 1006 also includes a graphical processing unit (GPU) 1020. The latter may also be used for computational purposes as an adjunct to, or instead of, the (CPU) 1010, for mathematical calculations.

The various components of the computer system 1000 are coupled to one another either directly or by coupling to suitable buses.

The methods described herein may be provided as a computer program products comprising a computer readable storage medium, such as non-volatile memory of the mobile wireless telecommunication computing device or of the order processing system of either a provider or a provider aggregator, having computer readable program code embodied therewith for executing the method. Thus, the non-volatile memory of the mobile wireless telecommunication computing device or order processing system would contain instructions which, when executed by the processor of the mobile wireless telecommunication computing device or order processing system, cause the mobile wireless telecommunication computing device or order processing system to execute the relevant method.

The above systems and methods may be implemented entirely in hardware, entirely in software, or by way of a combination of hardware and software. In a preferred embodiment, implementation is by way of software, which includes but is not limited to firmware, resident software, microcode, and the like. Furthermore, the above systems and methods may be implemented in the form of a computer program product accessible from a computer usable or computer readable medium providing program code for use by or in connection with a computer or any instruction execution system. In such embodiments, the computer program product may reside on a computer usable or computer readable medium in a computer such as the memory 912 of the onboard computer system 906 of the smartphone 900 or the memory 1012 of the computer 1006, or on a computer usable or computer readable medium external to the onboard computer system 906 of the smartphone 900 or the computer 1006, or on any combination thereof.

One or more currently preferred embodiments have been described by way of example. It will be apparent to persons skilled in the art that a number of variations and modifications can be made without departing from the scope of the claims.

What is claimed is:

1. A computer-implemented method for scheduling processing of an order for goods at a provider location, comprising:
   obtaining, by an order processing system associated with the provider, an arrival estimate for when a user associated with the order is expected to arrive at the provider location, wherein the arrival estimate is calculated by a computer system other than the order processing system and transmitted to the order processing system, whereby the order processing system does not have to calculate the arrival estimate to thereby distribute processing load away from the order processing system;
   the order processing system obtaining an order completion estimate for when processing of the order is expected to be completed;
   the order processing system comparing the arrival estimate and the order completion estimate;
   responsive to a determination that the arrival estimate and the order completion estimate substantially coincide, the order processing system providing a signal to commence processing of the order; and
   responsive to a determination that the arrival estimate and the order completion estimate do not substantially coincide, the order processing system updating at least one of the arrival estimate and the order completion estimate and returning to the step of comparing the arrival estimate and the order completion estimate after the updating.

2. The method of claim 1, wherein the arrival estimate and the order completion estimate are deemed to coincide when comparing the arrival estimate and the order completion estimate indicates that the user associated with the order is expected to arrive at the provider location before the order is expected to be completed.

3. The method of claim 1, wherein the order completion estimate is a fixed value.

4. The method of claim 1, wherein the order completion estimate is dynamically generated.

5. The method of claim 1, wherein the arrival estimate is an estimated travel time of the user to the provider location.

6. The method of claim 1, wherein the arrival estimate is an estimated arrival time of the user at the provider location.

7. The method of claim 1, wherein the order completion estimate is an estimated duration of the processing of the order.

8. The method of claim 1, wherein the order completion estimate is an estimated completion time for the order given a specified start time for the order.

9. The method of claim 1, wherein updating at least one of the arrival estimate and the order completion estimate comprises obtaining an updated arrival estimate based on time elapsed.

10. The method of claim 1, wherein updating at least one of the arrival estimate and the order completion estimate comprises obtaining a dynamically recalculated arrival estimate.

11. A computer-implemented method for scheduling processing of an order for goods at a provider location, comprising:
    obtaining, by an order processing system associated with the provider, an arrival estimate for when a user associated with the order is expected to arrive at the provider location, wherein the arrival estimate is calculated by a computer system other than the order processing system and transmitted to the order processing system whereby the order processing system does not have to calculate or otherwise obtain the arrival estimate to thereby distribute processing load away from the order processing system; and
    the order processing system using the arrival estimate to schedule processing of the order.

12. The method of claim 11, wherein using the arrival estimate to schedule processing of the order comprises scheduling processing of the order so that completion of processing of the order is expected to substantially coincide with arrival of the user at the provider location.

13. The method of claim 12, further comprising:
    the order processing system obtaining an order completion estimate for when processing of the order is expected to be completed;
    wherein scheduling processing of the order so that completion of processing of the order is expected to substantially coincide with arrival of the user at the provider location comprises using the arrival estimate and the order completion estimate to schedule processing of the order.

14. The method of claim 13, wherein using the arrival estimate and the order completion estimate to schedule processing of the order comprises comparing the arrival estimate and the order completion estimate.

15. The method of claim 14, wherein using the arrival estimate and the order completion estimate to schedule processing of the order comprises updating at least one of the arrival estimate and the order completion estimate and wherein comparing the arrival estimate and the order completion estimate comprises comparing a then-current arrival estimate and a then-current order completion estimate according to the updating.

16. The method of claim 11, wherein the arrival estimate is an estimated travel time of the user to the provider location.

17. The method of claim 11, wherein the arrival estimate is an estimated arrival time of the user at the provider location.

18. The method of claim 13, wherein the order completion estimate is an estimated duration of the processing of the order.

* * * * *